(12) United States Patent
Schmidt et al.

(10) Patent No.: US 10,107,520 B2
(45) Date of Patent: Oct. 23, 2018

(54) HEAT EXCHANGER COIL FOR A RECREATIONAL VEHICLE

(71) Applicants: Dometic Sweden AB, Solna (SE); BECKETT GAS, INC., North Ridgeville, OH (US)

(72) Inventors: Gale A. Schmidt, West Jordan, UT (US); Christopher C. Schmidt, West Valley, UT (US); Steve R. Matson, West Jordan, UT (US); Richard Maricic, Parma, OH (US)

(73) Assignees: Beckett Gas, Inc., North Ridgeville, OH (US); Dometic Sweden AB, Solna (SE)

( * ) Notice: Subject to any disclaimer, the term of this patent is extended or adjusted under 35 U.S.C. 154(b) by 443 days.

(21) Appl. No.: 14/331,578

(22) Filed: Jul. 15, 2014

(65) Prior Publication Data

US 2016/0018132 A1    Jan. 21, 2016

(51) Int. Cl.
| F24H 3/08 | (2006.01) |
| F28D 1/047 | (2006.01) |
| F28F 1/00 | (2006.01) |
| B60H 1/00 | (2006.01) |

(52) U.S. Cl.
CPC ......... *F24H 3/087* (2013.01); *B60H 1/00264* (2013.01); *B60H 1/00328* (2013.01); *B60H 1/00364* (2013.01); *F28D 1/0472* (2013.01); *F28F 1/006* (2013.01)

(58) Field of Classification Search
CPC .. F28D 1/04; B21D 53/06; B21D 9/03; F24H 3/087
USPC .......................................... 126/109; 165/163
See application file for complete search history.

(56) References Cited

U.S. PATENT DOCUMENTS

| 5,379,624 A * | 1/1995 | Harman ................. B21D 9/073 72/149 |
| 5,685,190 A * | 11/1997 | Yamamoto ............... B21D 9/03 72/466 |
| 2007/0199688 A1 | 8/2007 | Okonski, Sr. et al. |
| 2011/0155366 A1 * | 6/2011 | Brunn ..................... F28D 7/024 165/287 |

FOREIGN PATENT DOCUMENTS

| AU | 2015289763 | | 12/2016 |
| CA | 2954152 | | 12/2016 |
| JP | 2013011404 | | 1/2013 |
| JP | 2013011404 A | * | 1/2013 |
| KR | 20120038621 | | 4/2012 |
| KR | 20120108177 | | 10/2012 |
| KR | 20130011213 | | 1/2013 |
| KR | 20130011213 A | * | 1/2013 |
| WO | 2016011073 | | 1/2016 |

OTHER PUBLICATIONS

International Search Report and Written Opinion for PCT/US2015/040442 dated Oct. 21, 2015.
Transmittal Letter of Related Cases. Apr. 27, 2017.

* cited by examiner

*Primary Examiner* — Avinash Savani
*Assistant Examiner* — Aaron Heyamoto
(74) *Attorney, Agent, or Firm* — Middleton Reutlinger

(57) ABSTRACT

A compact heat exchanger suitable for use in a forced air furnace for a recreational vehicle includes a multi-turn coil having linear segments interposed between bends. The coil is formed from a monolithic tube with portion of the tube being expanded to vary the diameter.

13 Claims, 26 Drawing Sheets

HEAT EXCHANGER COIL FOR A RECREATIONAL VEHICLE

CROSS-REFERENCE

Cross-reference is made to U.S. patent application Ser. No. 29/496,587 entitled "DESIGN OF A HEAT EXCHANGER," which is filed on the same day as the present application and is expressly incorporated herein by reference.

BACKGROUND

The present application is related to heat exchangers for use in vehicles, such as recreational vehicles, for example. More specifically, the present disclosure is related to the structure of a tubular heat exchanger for a furnace in a recreational vehicle.

Recreational vehicles, also known as RVs, provide mobile living quarters and require functionality similar to that found in the typical home. For example, RVs that are equipped to be used in areas with lower temperatures often include an integral furnace that is operable to recirculate air within the RV to control the temperature within the RV. In some cases, the furnace functions as a standalone unit with a fan that draws air in from the area surrounding the furnace, passes it over a heat exchanger, and expel the air into the general vicinity of the furnace. In other cases, the furnace may be equipped with ports that connect to ducting that transfers the air from an inlet that is distal from the furnace and/or directs heated air to outlets that are distal to the furnace.

As with any heat exchanger, a furnace for an RV is designed to maximize heat transfer so that energy/heat that is produced by a burner is efficiently transferred to the air flowing over the heat exchanger with minimal heat loss. A particular challenge in RVs is to construct a heat exchanger that provides an efficient transfer, in a minimal space. Space in an RV is at a premium. Any space taken by an appliance, such as a furnace, reduces the amount of space available to the occupants of the RV. In addition, it is important to control the cost of production to minimize the expense of a heat exchanger, such as the type of heat exchanger used in a furnace for an RV.

For example, in some cases, the heat exchanger is a multi-piece assembly that must be welded in several locations. The labor for handling the parts and performing welds makes the parts expensive. In addition, the tooling for all of the parts requires significant investment.

SUMMARY

The present application discloses one or more of the features recited in the appended claims and/or the following features which alone or in any combination, may comprise patentable subject matter.

According to a first aspect of the present disclosure, a heat exchanger comprises a burner and a continuous multi-turn coil. The coil includes at least two revolutions between an inlet and an outlet, each revolution of the coil including a plurality of generally linear portions, each generally linear portion interposed between two bends.

In some embodiments, the coil is formed from a length of monolithic tube.

In some embodiments, the coil has at least one section that has a cross-sectional tube diameter that is different from the cross-sectional tube diameter in another section of the coil.

In some embodiments, at least one of the two bends is in a direction that is opposite of the other of the two bends.

In some embodiments, at least one bend is defined by a tube segment wherein the centerline defined by the cross-sectional diameter of the tube segment does not generally lie in a single plane.

In some embodiments, at least two of the bends of the coil are each defined by a tube segment and the centerline defined by the cross-sectional diameter of the first tube segment lies in a first generally common plane. The centerline defined by the cross-sectional diameter of the second tube segment may lie in a second generally common plane. In some embodiments, the first plane is generally parallel and spaced apart from the second plane.

In some embodiments, the cross-sectional diameter of a first tube segment is different from the cross-sectional diameter of a second tube segment.

According to a second aspect of the present disclosure, a heat exchanger comprises a burner and a continuous multi-turn coil. The coil includes at least one revolution between an inlet and an outlet. The coil includes a plurality of generally linear portions, each generally linear portion interposed between two bends. The inlet of the coil has a first cross-sectional diameter and the outlet of the coil has a second cross-sectional diameter that is smaller than the first cross-sectional diameter. The inlet defines a centerline and the outlet defining a centerline, and the centerlines of the inlet and outlet are parallel.

In some embodiments, the coil is formed from a length of monolithic tube.

In some embodiments, the coil has at least one section that has a cross-sectional tube diameter that is different from the cross-sectional tube diameter of both the inlet and the outlet.

In some embodiments, at least one of the two bends is in a direction that is opposite of the other of the two bends.

In some embodiments, at least one bend is defined by a tube segment wherein the centerline defined by the cross-sectional diameter of the tube segment does not generally lie in a single plane.

In some embodiments, at least two of the bends of the coil are each defined by a tube segment. The centerline defined by the cross-sectional diameter of the first tube segment may lie in a first generally common plane and the centerline defined by the cross-sectional diameter of the second tube segment may lie in a second generally common plane. The first plane may be generally parallel to the second plane. The first plane may be spaced apart from the second plane.

In some embodiments, the cross-sectional diameter of the first tube segment is different from the cross-sectional diameter of the second tube segment.

In some embodiments, the inlet defines an opening and the outlet defines an opening, the inlet and the outlet facing the same direction.

In some embodiments, at least one bend is defined by a tube segment wherein the centerline defined by the cross-sectional diameter of the tube segment does not generally lie in a single plane.

In some embodiments, the coil includes at least two bends separated by a single linear segment. Each of the two bends may be defined by a respective tube segment. The centerline defined by the cross-sectional diameter of the respective tube segments may not generally lie in a single plane.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
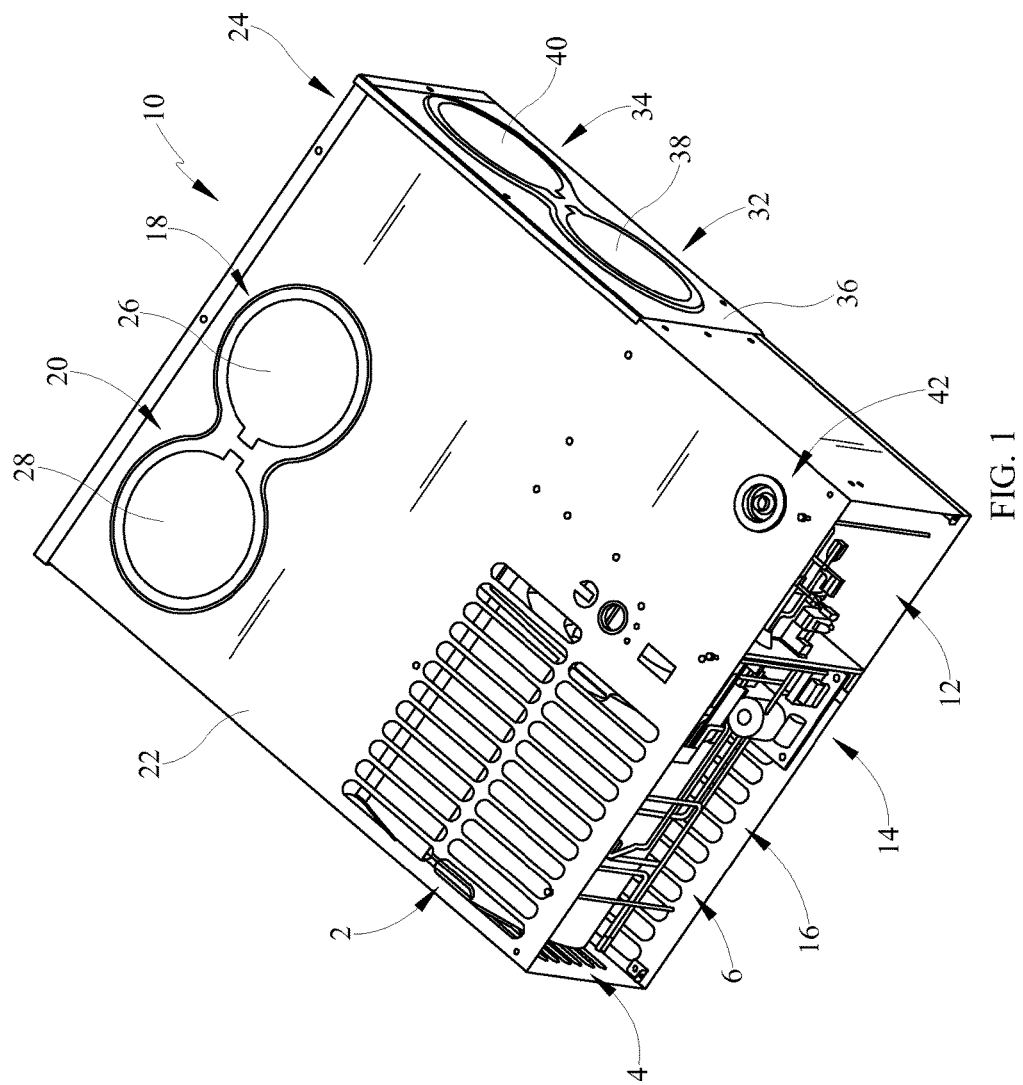
FIG. 1 is a perspective view of a forced air furnace assembly for a recreational vehicle with portions removed.

A compact furnace 10 for recreational vehicle (RV) is shown in FIG. 1 with a front cover removed to expose a burner compartment 12, a portion of a control assembly 14, and a portion of a blower assembly 16. As will be described, the embodiment of FIG. 1 utilizes a single pass, high input heat exchanger. A housing 24 of the furnace 10 is formed with a pair of ports 18 and 20 positioned on a top wall 22 of the housing 24 of the furnace 10. The ports 18 and 20 are of the knockout type which permits a user to remove a respective portion 26 or 28 to open the respective port 18 or 20 to a heat exchanger box 30 (best seen in FIG. 2). By opening ports 18 and/or 20, a user may install a duct onto either of the ports 18 and 20, or both, to provide a path for a flow of air out of the heat exchanger box 30. An additional two ports 32 and 34 are positioned on a sidewall 36 of the housing 24. Ports 32 and 34 have knockout portions 38 and 40, respectively, which permit a user to couple one or two ducts to the ports 32 and 34, provide an outlet for heated air to be transferred through the ducts to a position distal to the furnace 10. A gas port 42 is exposed through the wall 22 to provide an inlet for gas into a gas valve 46 positioned in the burner compartment 12. Other ports may be positioned elsewhere on the housing. Ambient air from the interior of the RV is drawn into grills 2, 4, and/or 6 formed in the housing 24 of the furnace 10. The ambient air is moved by the blower assembly 16 and transferred into the heat exchanger box 30 as indicated by an arrow 8 in FIG. 2. The blower assembly 16 then forces the air over a coil 44 and through any opened ports, such as ports 18, 20, 32, or 34 when they are opened.

Figure 2:
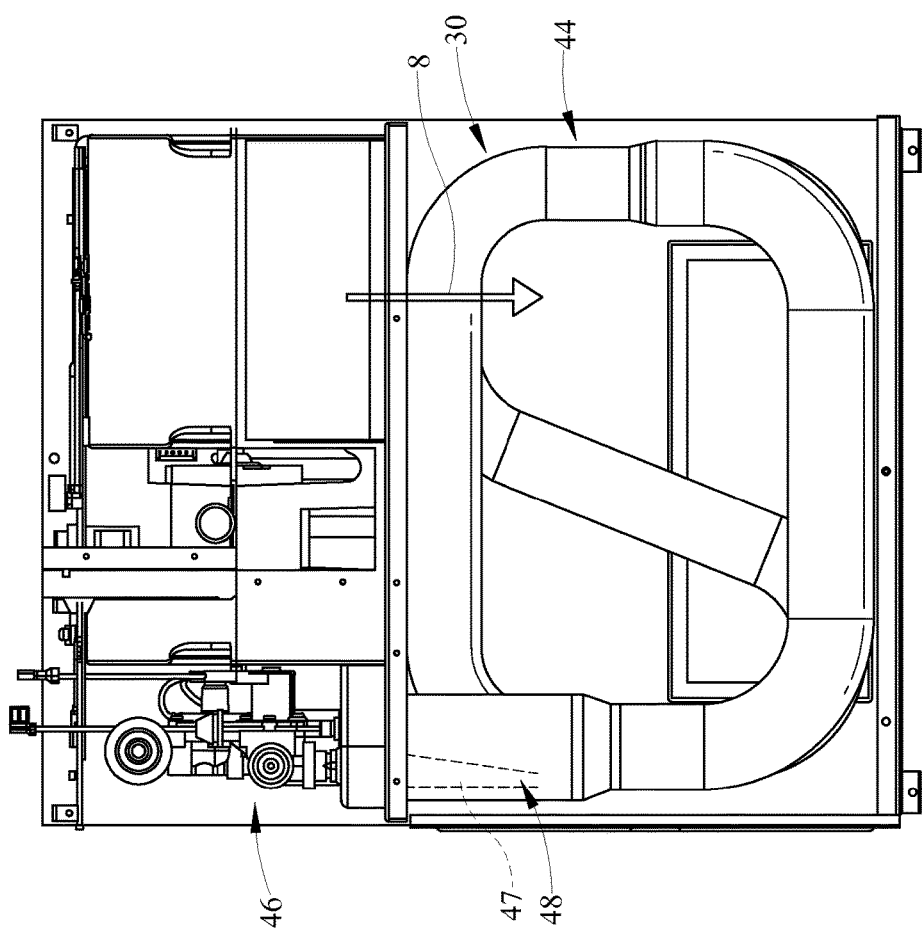
FIG. 2 is a top plan view of the forced air furnace of FIG. 1 with portions removed to show a heat exchanger box which includes a first embodiment of heat exchanger coil.
Figure 3:
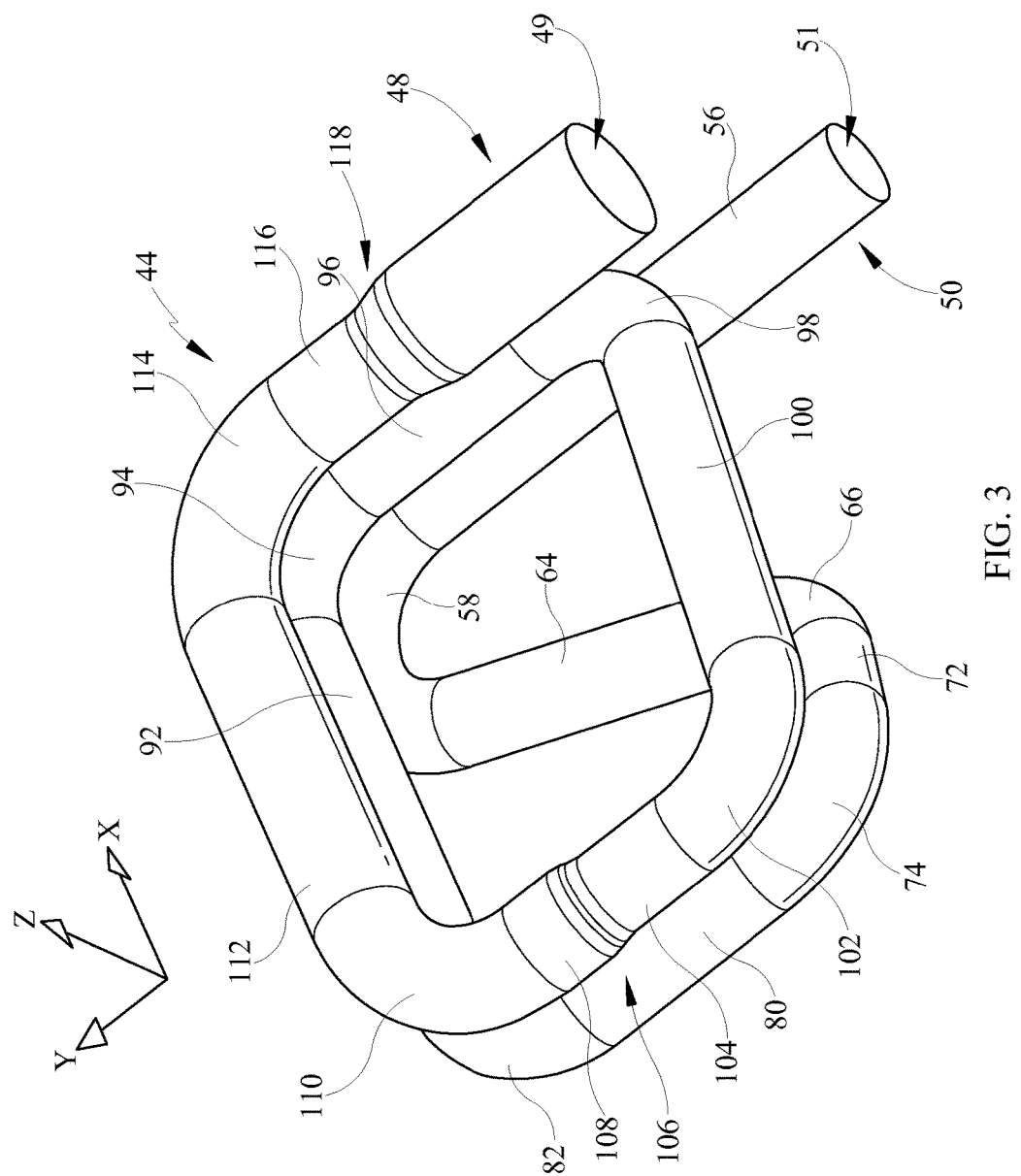
FIG. 3 is a perspective view of the heat exchanger coil of FIG. 2.
Figure 6:
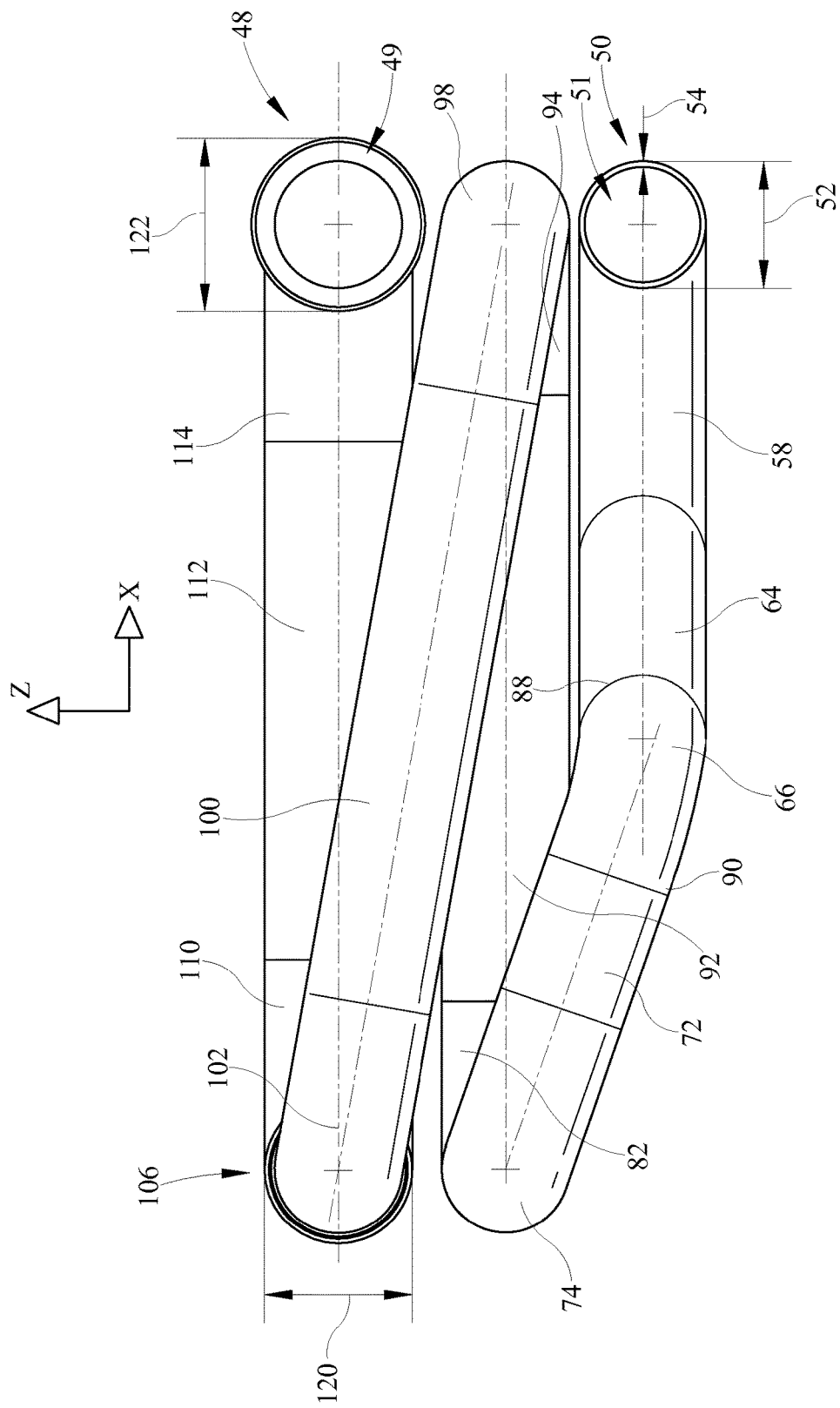
FIG. 6 is a front plan view of the first embodiment of heat exchanger coil.
Figure 7:
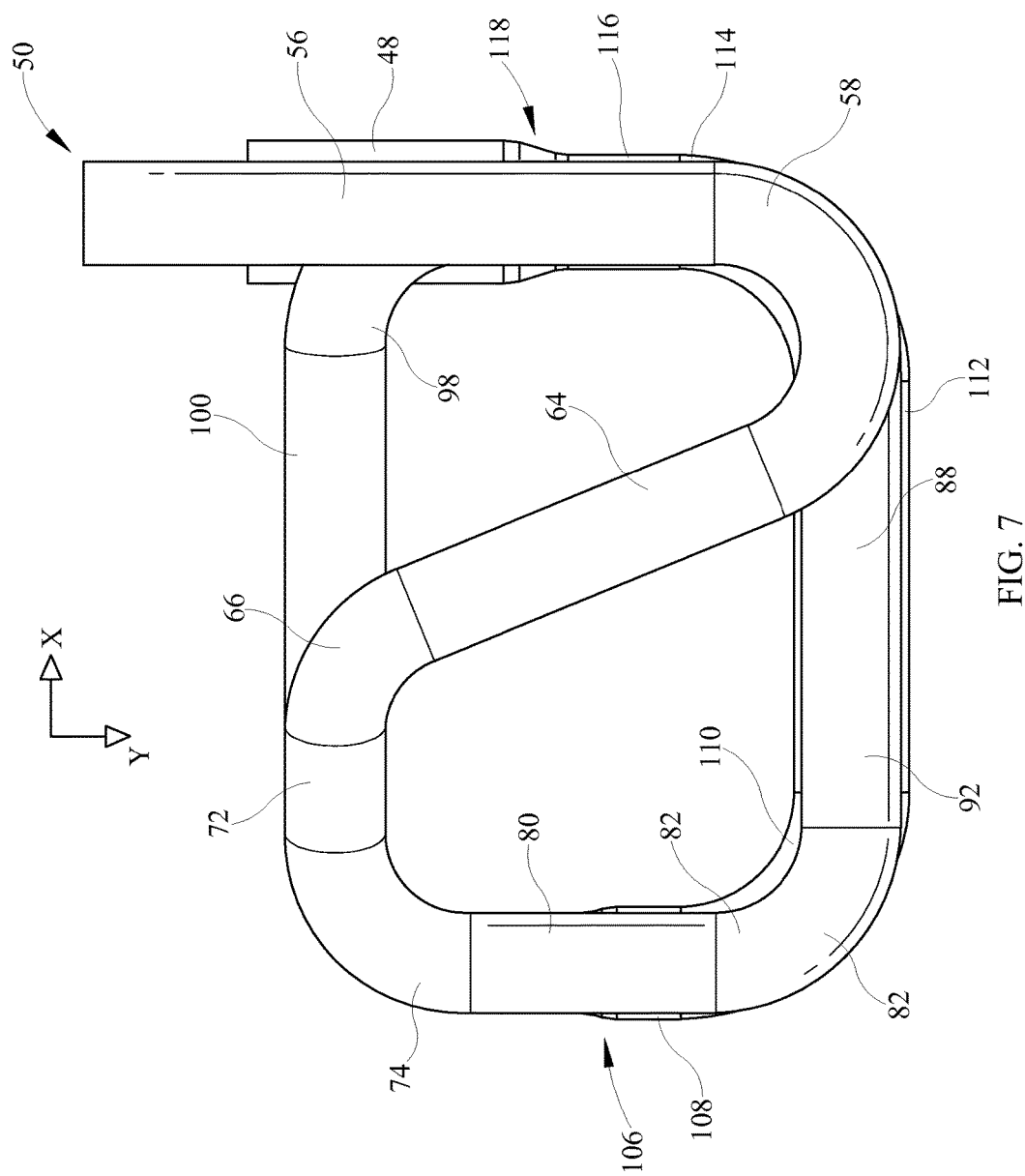
FIG. 7 is a bottom plan view of the first embodiment of heat exchanger coil.
Figure 8:
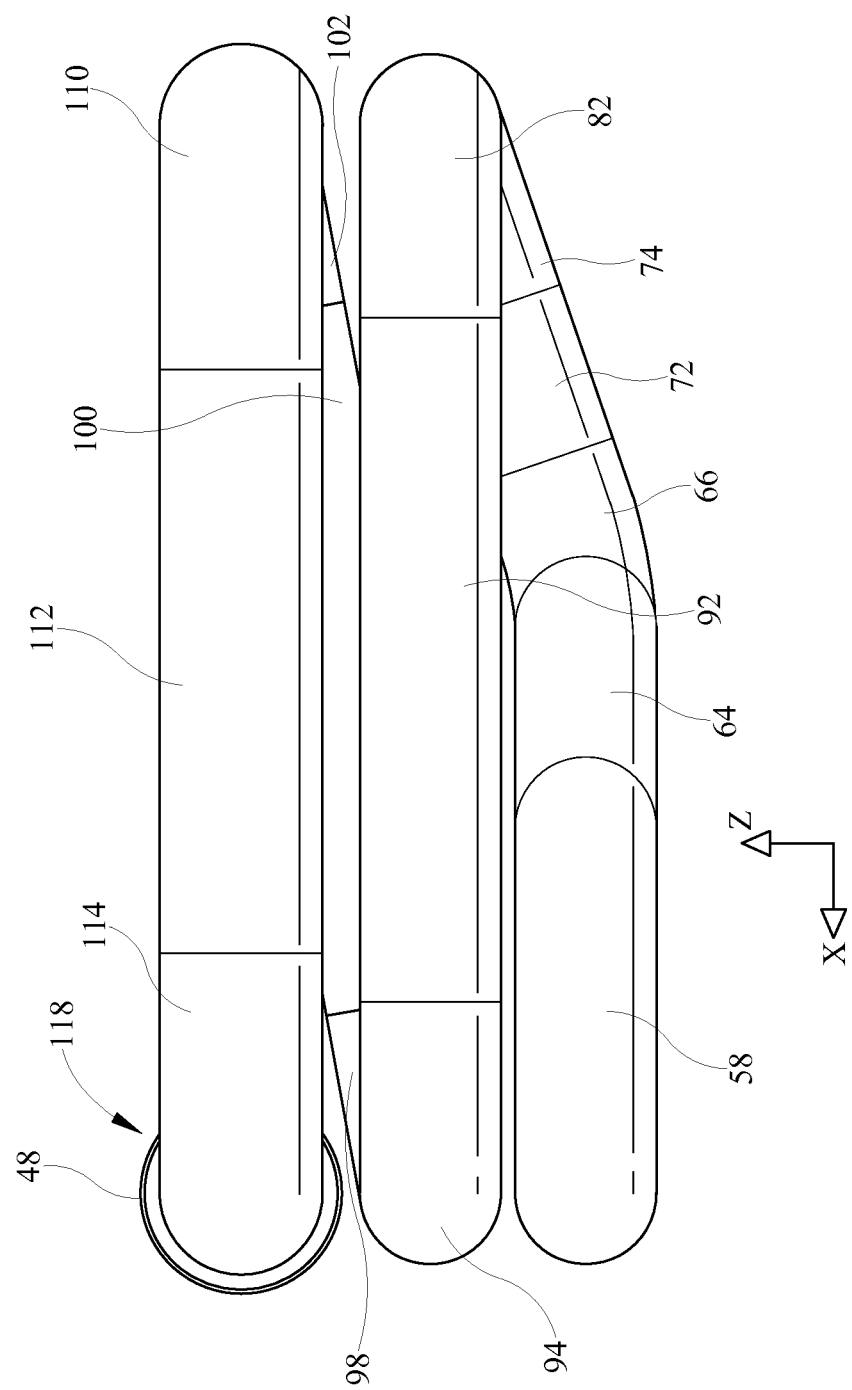
FIG. 8 is a back plan view of the first embodiment of heat exchanger coil.
Figure 9:
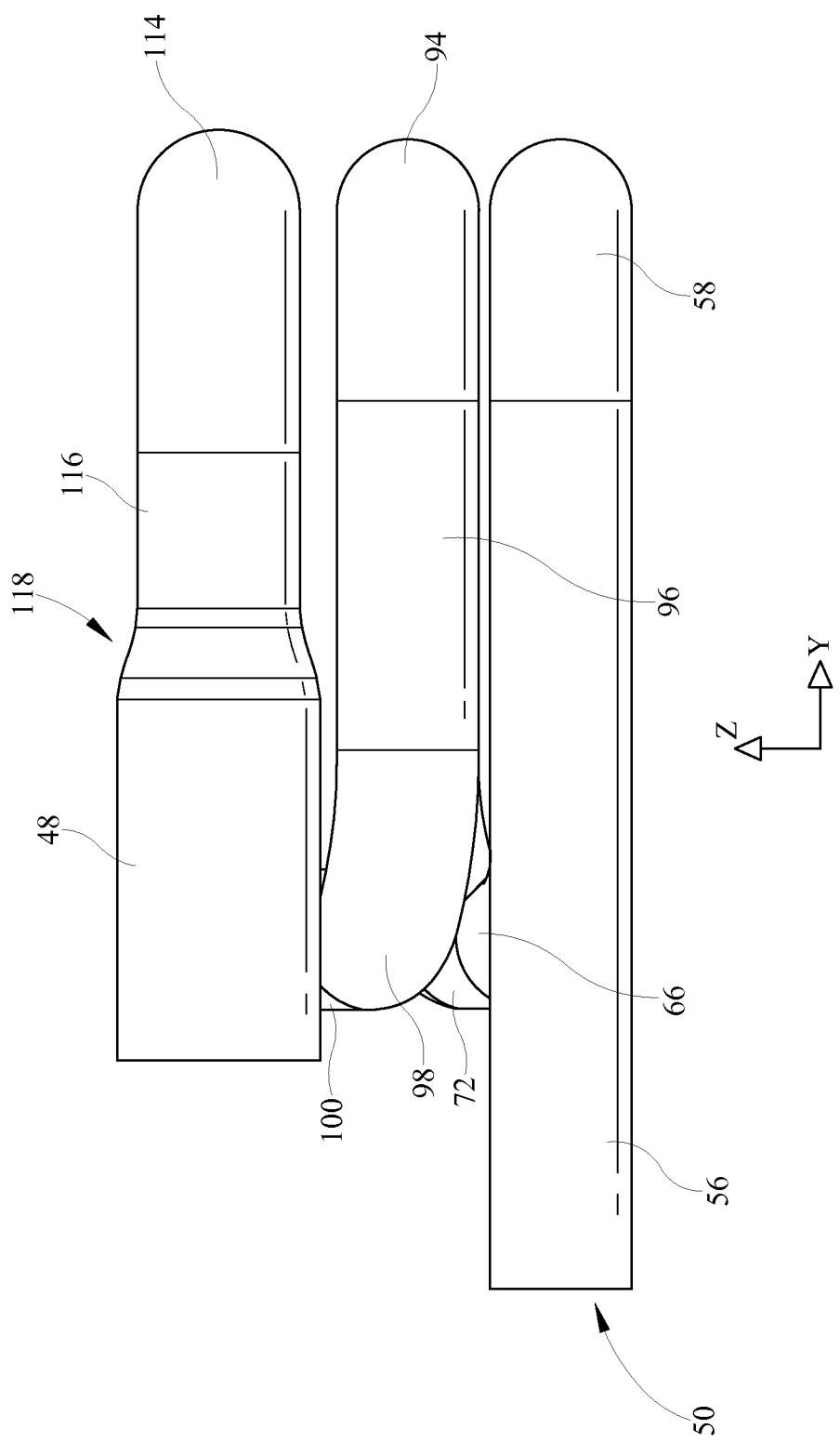
FIG. 9 is a side plan view of the first embodiment of heat exchanger coil taken from the right side as the first embodiment of heat exchanger coil is presented in FIGS. 5-7.
Figure 10:
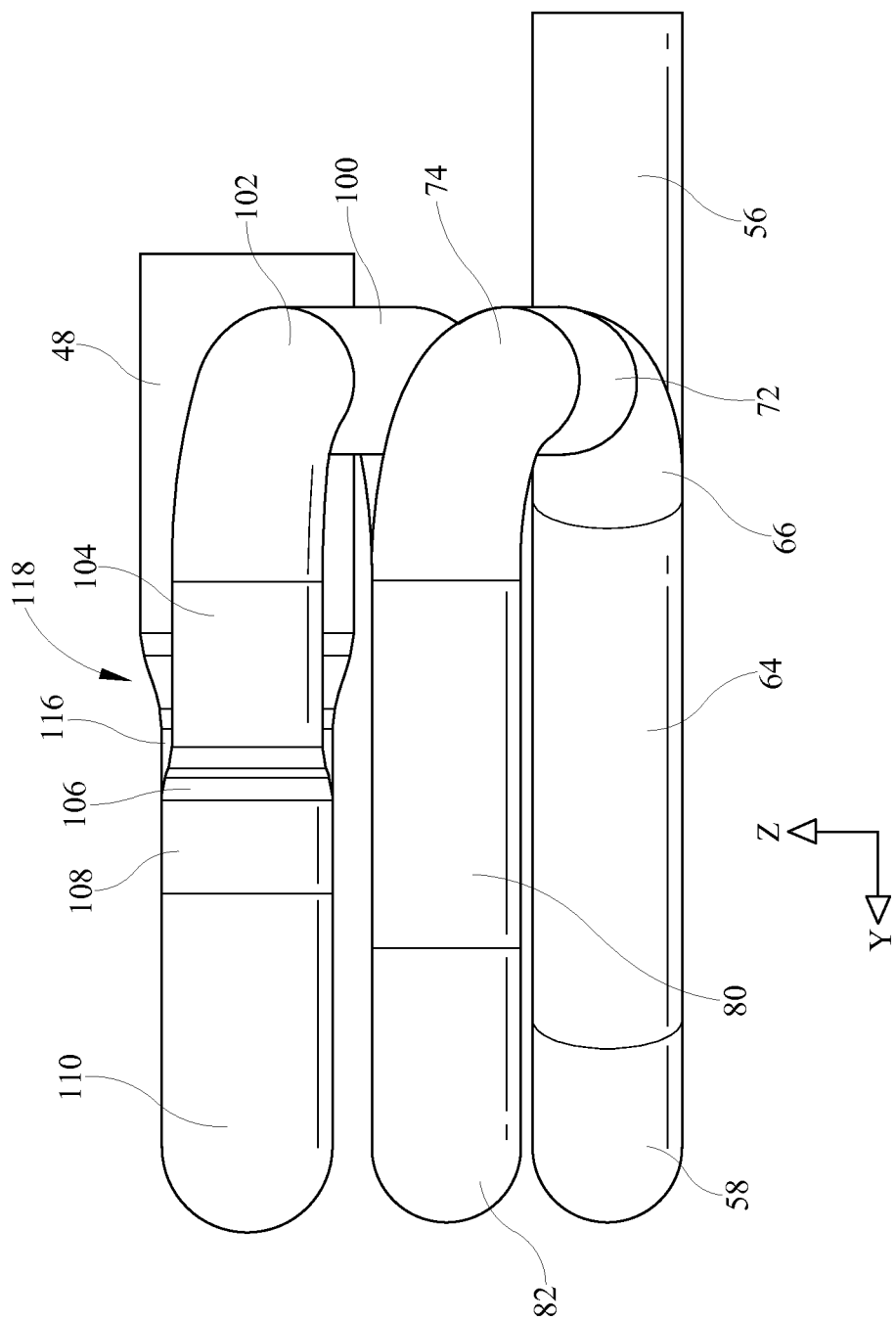
FIG. 10 is a side plan view of the first embodiment of heat exchanger coil taken from the left side as the first embodiment of heat exchanger coil is presented in FIGS. 5-7.
Figure 11:
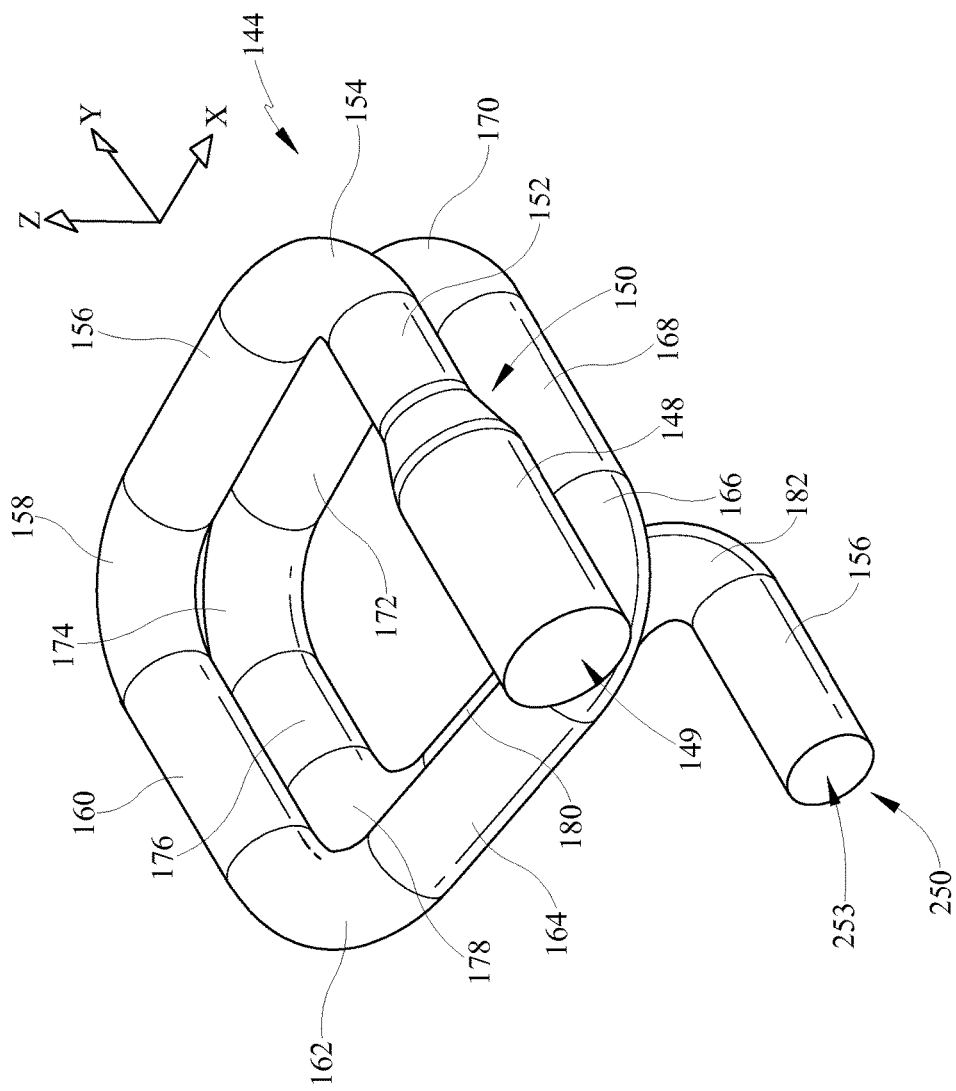
FIG. 11 is a perspective view of a second embodiment of heat exchanger coil.

Referring now to FIG. 2, the coil 44 is positioned in the heat exchanger box 30 and coupled to the gas valve 46 such that a burner 47 extends into a combustion chamber 48 of the coil 44 and generates a flame. The products of combustion are transferred through the coil 44 from the combustion chamber 48 to an outlet 50 seen in FIG. 3. The combustion chamber 148 defines an annular opening 49, or inlet, through which gas and oxygen flow into the combustion chamber 48. The outlet 50 defines an annular opening 51 through which the products of combustion discharge to the exterior of the RV. As seen in FIG. 6, the inlet opening 49 is positioned directly above the outlet opening 51 so that they face in the same direction.

The coil 44 and heat exchanger box 30 act as a shell and coil heat exchanger with air being passed through the heat exchanger box 30 being heated by the coil 44. As the products of combustion are transferred through the coil 44, the coil 44 is heated. As air is passed over the surface of the coil 44, the heat from the coil 44 is transferred to the air so that ambient air from the interior of the RV is heated and transferred back out to the interior of the RV through the ports 18, 20, 32 and/or 34. In general, the structure of the furnace 10 is known in the art and will not be discussed in detail here.

The coil 44 is a monolithic tubular structure formed from a single tube and having a plurality of turns as will be described below. In one illustrative embodiment, the tube is 1.75 inch diameter aluminized steel with a 0.043 inch wall thickness. The structure of the coil 44 will be described with reference to FIGS. 3 and 5-10 which shows various views of the coil 44. As used herein, the term "compound bend" refers to a bend in which the centerline of the tube of the coil 44 follows a path that is non-planar. In contrast, standard bends or non-compound bends are bends in which the centerline of the tube of the coil 44 lies generally in a single plane. The coil 44 comprises both standard bends and compound bends as described below.

With reference to the outlet 50 and FIG. 6, the coil 44 is formed from a tube having an outer diameter 52 and a wall thickness 54. Referring generally to FIGS. 3 and 5-11, the coil includes a first straight section 56 which extends from the outlet 50 to a first bend 58. The coil 44 then extends from the first bend 58 through a second straight section 64 to a second bend 66. The second bend 66 extends to a third straight section 72. The third straight section 72 extends to a third bend 74. As will be described in further detail below, the second bend 66 and third bend 74 are compound bends; they each transition through all three dimensions so that the coil 44 has portions offset in the z axis.

The third bend 74 extends to a fourth straight section 80 which transitions into a fourth bend 82. The fourth bend 82 can be characterized as a straight bend; the centerline of the tube lies entirely in the plane and has no z component. The fourth bend 82 transitions to a fifth straight section 92 and then transitions to a fifth bend 94 which is also in the x-y plane only. The fifth bend 94 transitions to a sixth straight section 96 and the coil 44 then transitions to a sixth bend 98 which has a z component, making the bend 98 a compound bend. The sixth bend 98 transitions to a straight section 100 which transitions to a seventh bend 102 which also has a z component. The seventh bend 102 transitions to an eighth straight section 104.

The eighth straight section 104 transitions through an expansion 106 in which the diameter of the tube of the coil 44 is expanded to a dimension represented by reference numeral 120 shown in FIG. 6. In the illustrative embodiment, the diameter 120 is 2.0 inches. The expansion diameter is achieved mechanically by displacing the tube to increase the diameter, thereby reducing the wall thickness.

The expansion 106 transitions to a ninth straight section 108 having the diameter 120. The ninth straight section 108 transitions to an eighth bend 110 which is in the x-y plane only. The eighth bend 110 extends to a tenth straight section 112. The tenth straight section 112 transitions to the ninth bend 114. The ninth bend 114 transitions to an eleventh straight section 116.

The eleventh straight section 116 transitions through an expansion 118 to the combustion chamber 48 which has a still larger diameter 122 as shown in FIG. 6. The expanded diameter 122 is again achieved mechanically by working the tube to increase the diameter, thereby reducing the wall thickness.

It should be noted that the first bend 58 turns in the opposite direction in the x-y plane as compared to the remaining bends 66, 74, 82, 94, 98, 102, 110, and 114. The change in direction is necessary to allow the combustion chamber 48 and outlet 50 to both return to the burner compartment 12 with minimal space consumption.

Still further, the use of compound bends 66, 74, 98, and 102 allows the coil 44 to be closely compacted and yet have extensive surface area on the coil 44 to be contacted by air traveling through the heat exchanger box 30.

Figure 4:
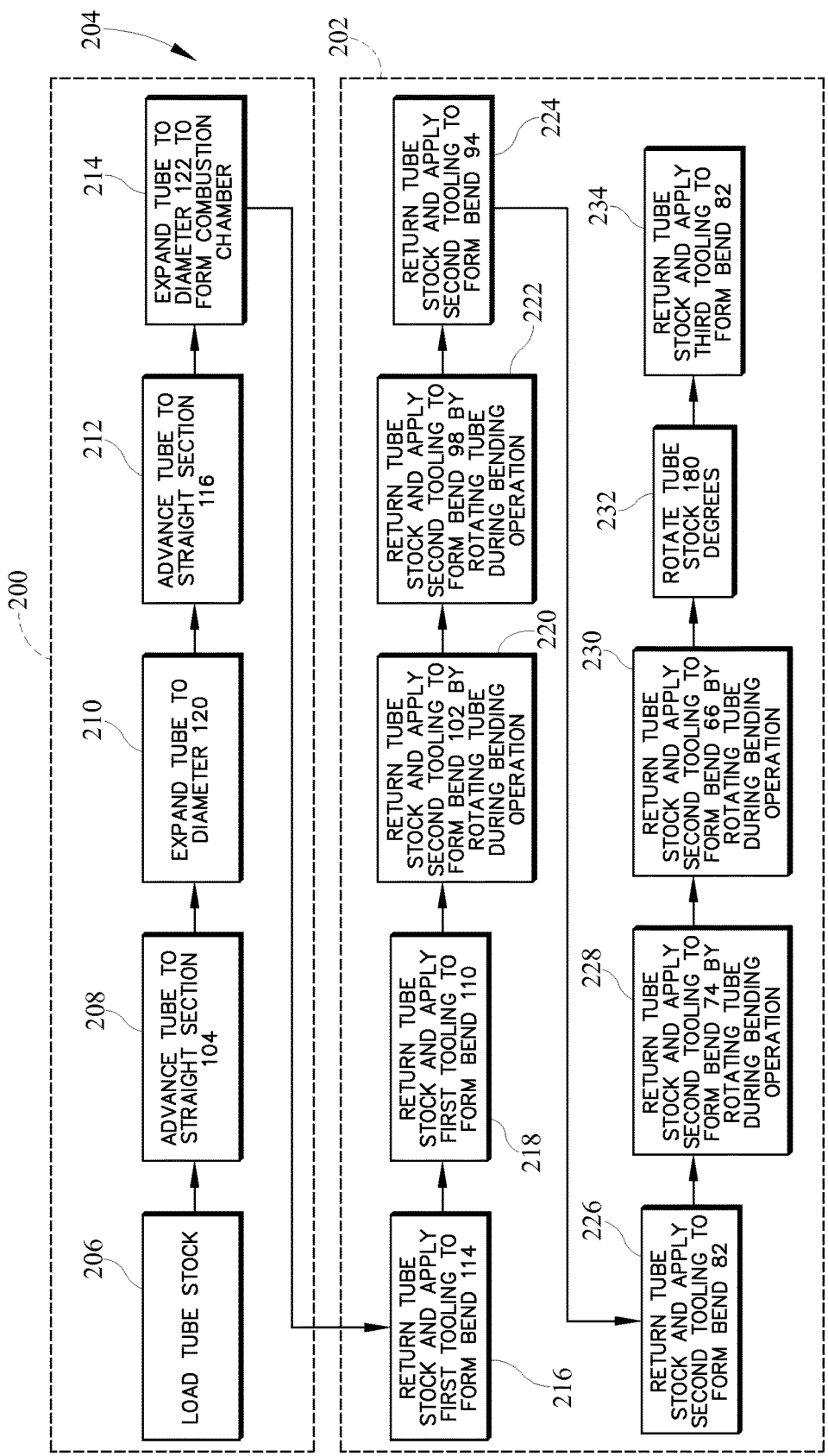
FIG. 4 is a process flow diagram outlining an embodiment of a manufacturing process that may be used to produce the first embodiment of heat exchanger coil.
Figure 5:
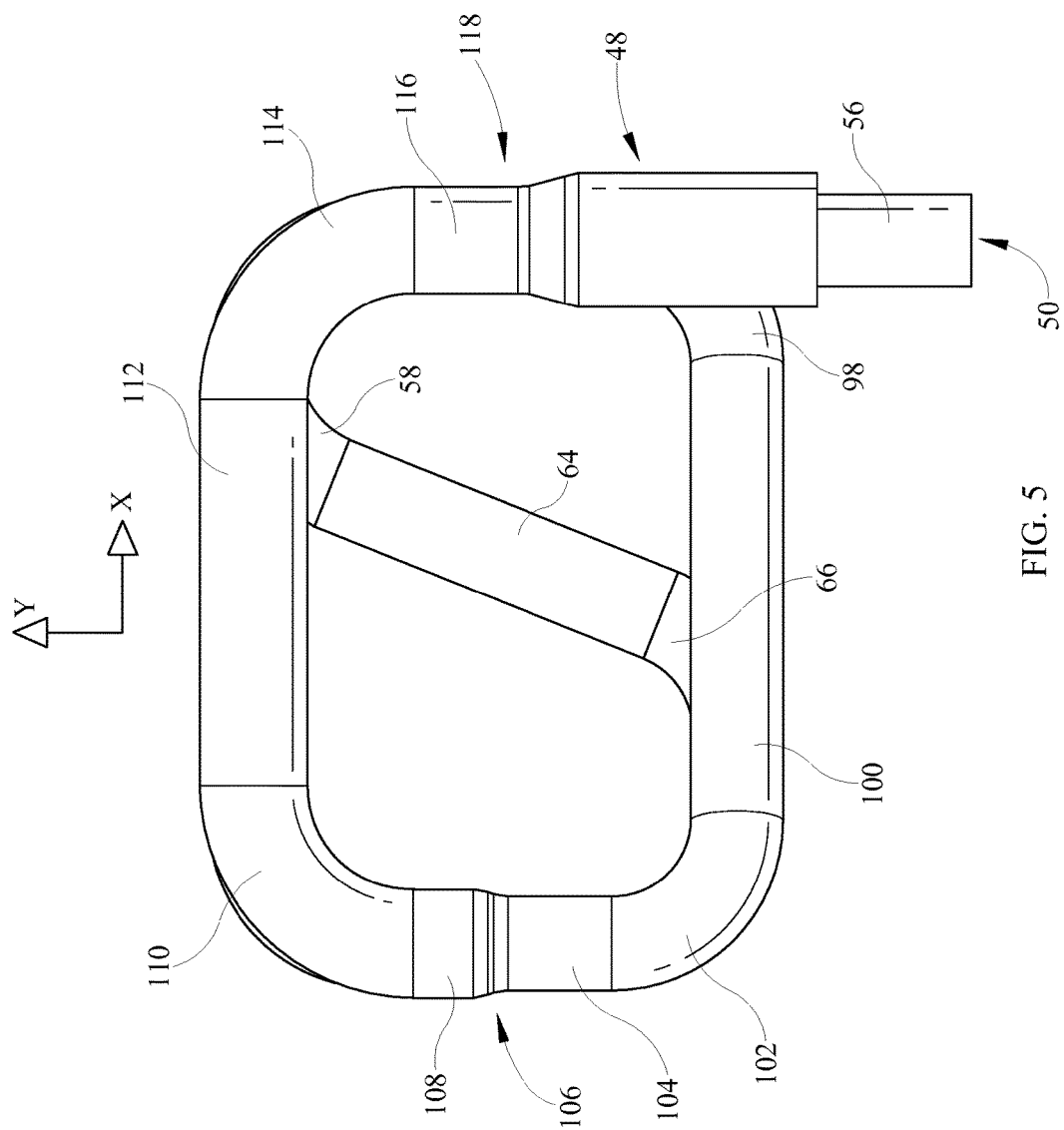
FIG. 5 is a top plan view of the first embodiment of heat exchanger coil.

An illustrative process flow for forming the coil 44 is shown FIG. 4. The coil forming process 204 can be illustrated as two separate processes: a tube sizing process 200 and a coil shaping process 202. In the tube sizing process 200, the tube stock is loaded into the forming apparatus at step 206. The tube is advanced to a predetermined location, such as the location of straight section 104 in step 208. At step 210, the tube is mechanically deformed to expand the diameter and reduce the wall thickness. In some embodiments, this is accomplished by inserting a roller into the interior of the tube and clamping a die on the outer diameter of the tube. The roller is then expanded and rotated to work the tube material, expanding into the die. In some embodiments, the roller and die move along the length of the tube as it is expanded.

At step 212, the tube is advanced to a second location, such as straight section 116. At step 214, the tube is further expanded using a separate roller and die pair to form the combustion chamber 48.

Once the tube is expanded appropriately, the coil shaping process 202 commences when the tube is positioned in a tube bending apparatus at step 216 and a first set of bend tooling which matches the outer diameter 120 is applied and the bend 114 is formed. At step 218, the tube is then further advanced and the first set of bend tooling is applied to form bend 110.

The first set of bend tooling is replaced with a second set of bend tooling which corresponds to diameter 52 and the tube is advanced to position the tube to form bend 102 at step 220. The bend 102 is formed by simultaneously bending the tube and rotating it along its longitudinal axis to form the compound bend 102. The tube is then advanced again and at step 222, the bend 98 is formed similarly to bend 102, in both cases using the second set of tooling.

At step 224 the tube is advanced and the bend 94 is formed by the second set of tooling. The tube is still advanced again and the bend 82 is formed using the second tooling.

At step 228, the tube is advanced and the bend 74 is formed using the technique of combining the rotation of the tube about the longitudinal axis as the bend 74 is formed by the second set of tooling to form the compound bend 74. The tube is then advanced at step 230 and the bend 66 is formed similarly by rotating the tube about the longitudinal axis as the bend 66 is formed.

The tube is then rotated about the longitudinal axis by 180° at step 232. This allows the bend 82 to be formed at a reverse angle as compared to the bends 114, 110, 102, 98, 94, 82, 74, and 66. After the tube is rotated at step 232, a third set of tooling is applied. The third set of tooling corresponds to diameter 52 but varies the bend radius to be applied as compared to the second set to the tube and bend 82 is formed.

While not disclosed as part of the process described, in some embodiments, the coil 44 may be trimmed to meet dimensional requirements. Other finishing operations may be applied to de-burr the coil 44 as well.

Figure 14:
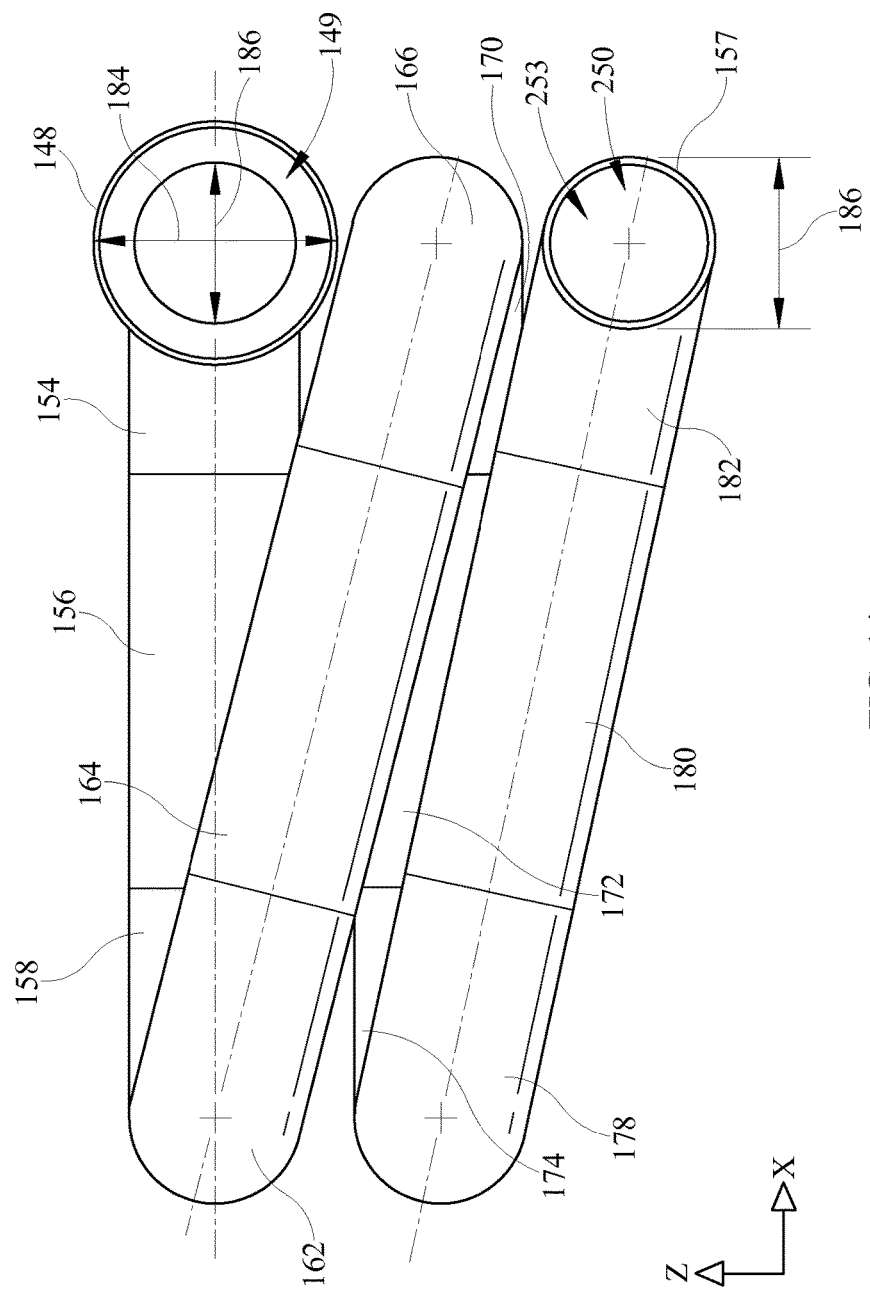
FIG. 14 is a front plan view of the second embodiment of heat exchanger coil.
Figure 15:
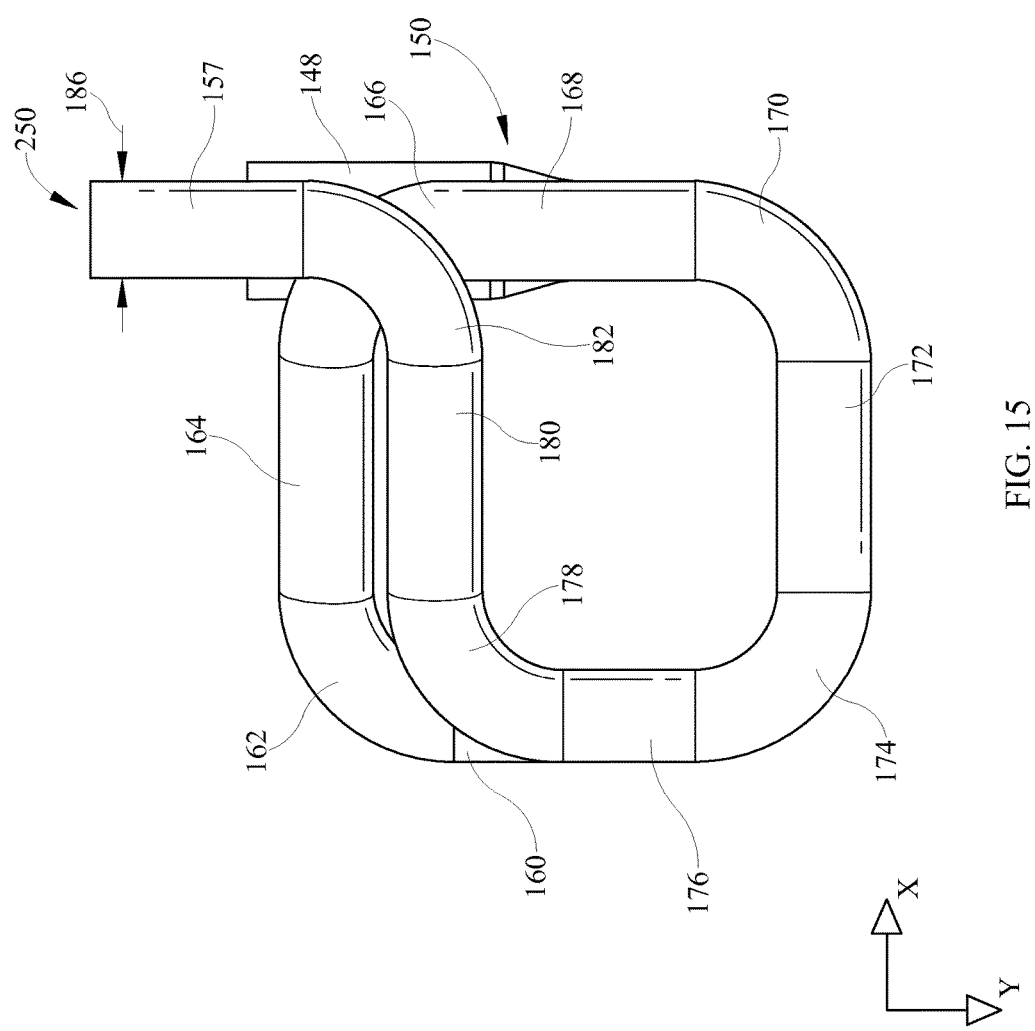
FIG. 15 is a bottom plan view of the second embodiment of heat exchanger coil.
Figure 16:
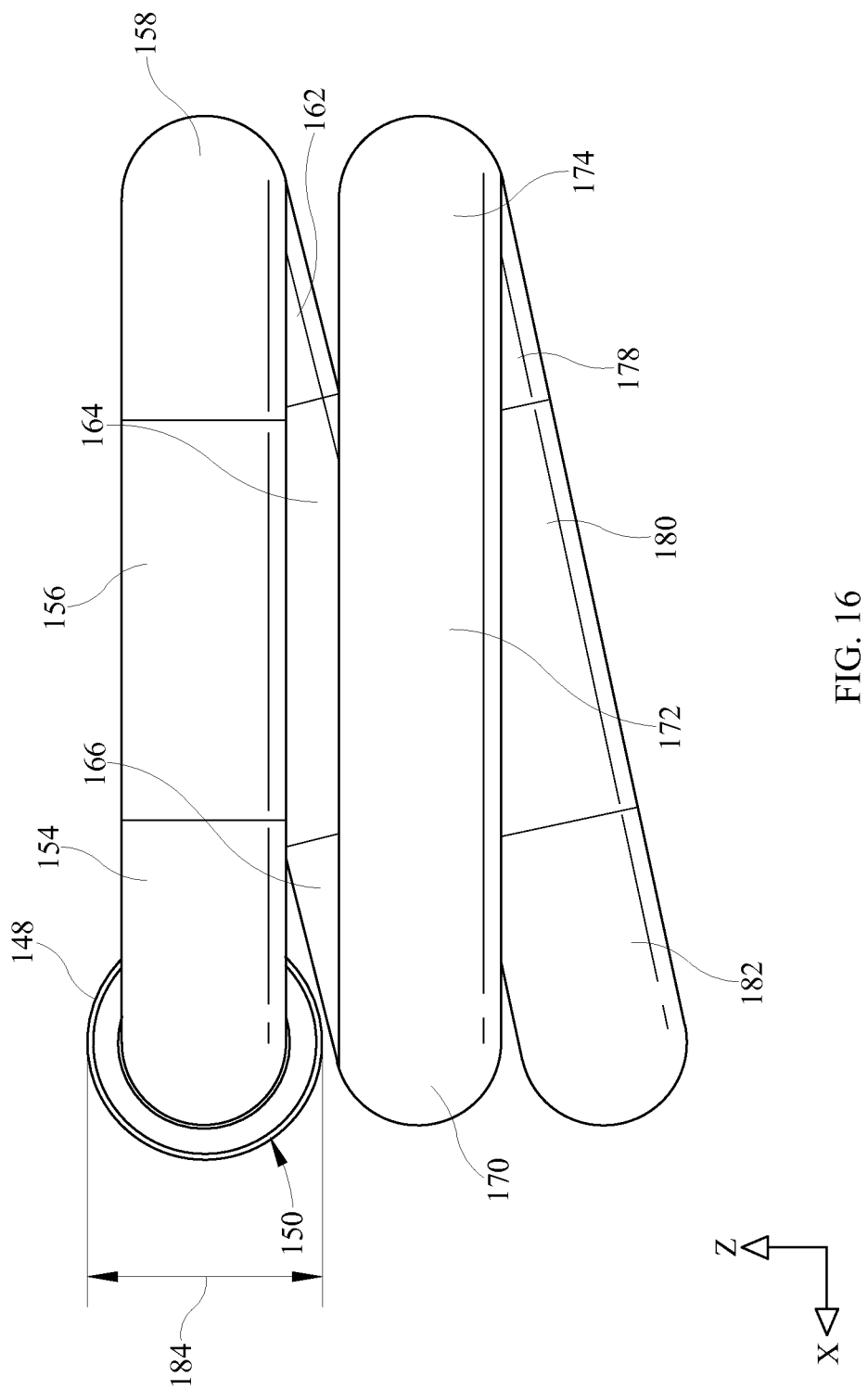
FIG. 16 is a back plan view of the second embodiment of heat exchanger coil.
Figure 17:
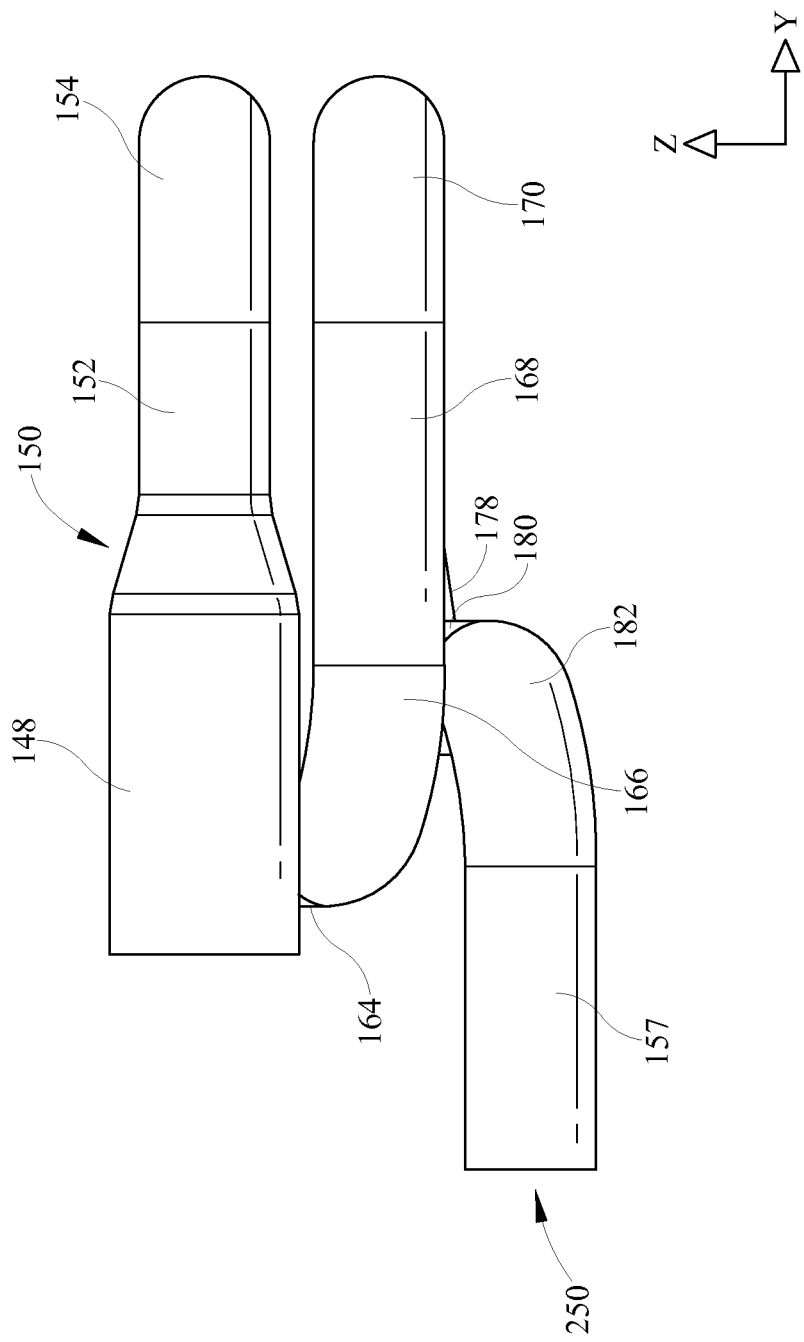
FIG. 17 is a side plan view of the second embodiment of heat exchanger coil taken from the right side as the second embodiment of heat exchanger coil is presented in FIGS. 13-15.
Figure 18:
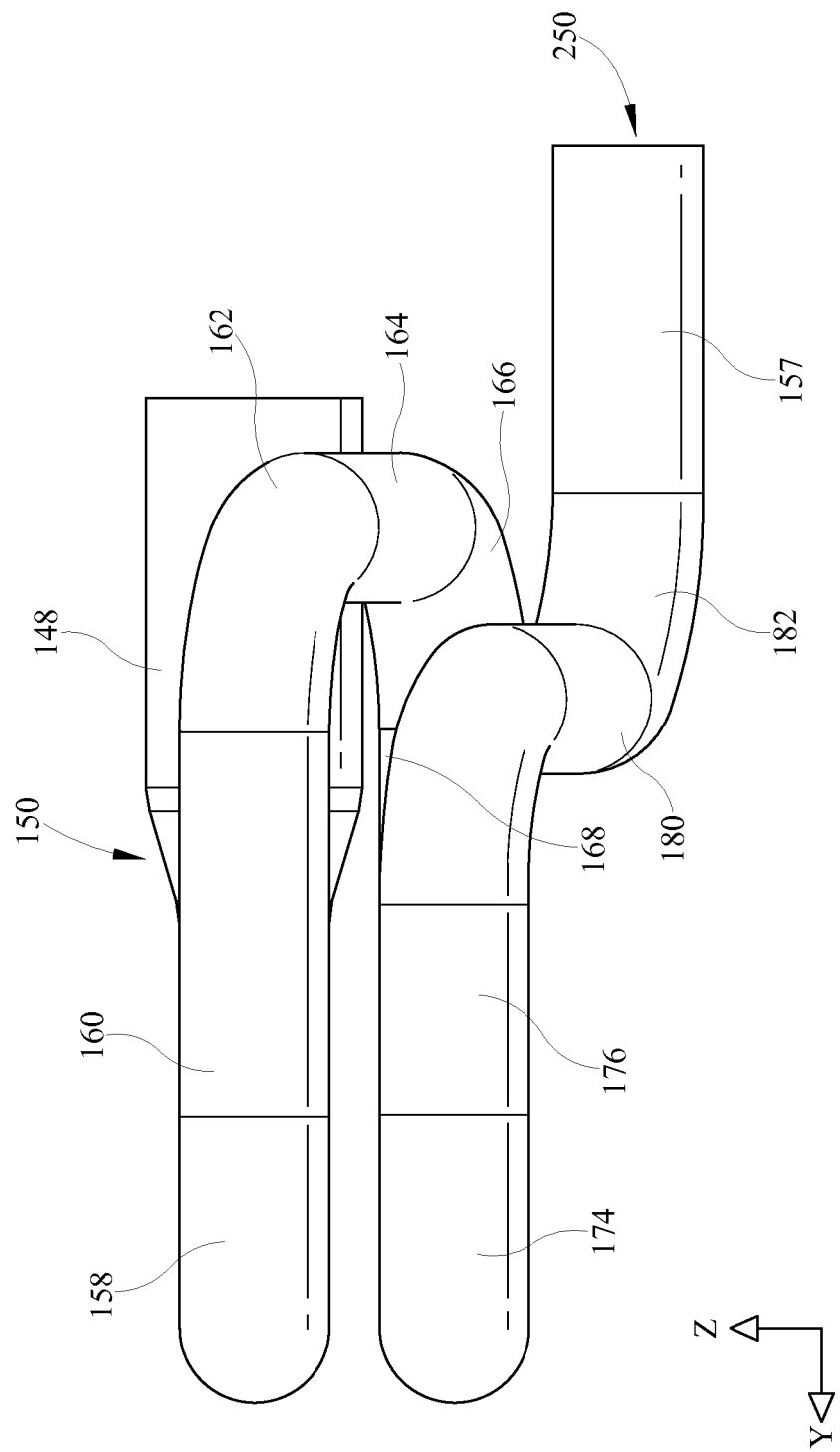
FIG. 18 is a side plan view of the second embodiment of heat exchanger coil taken from the left side as the second embodiment of heat exchanger coil is presented in FIGS. 13-15.
Figure 19:
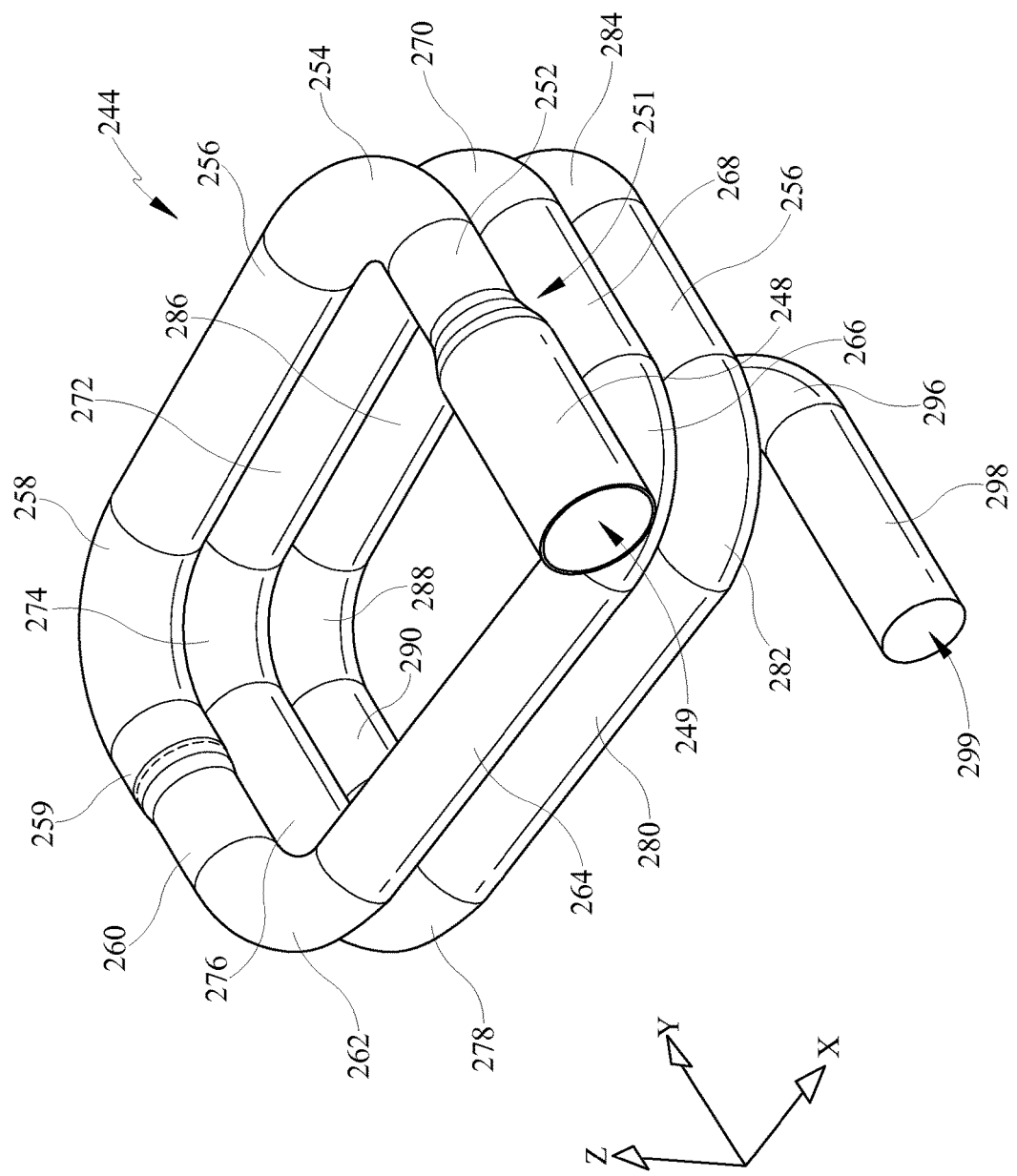
FIG. 19 is a perspective view of a third embodiment of heat exchanger coil.

In another embodiment shown and described in FIGS. 11-19, another heater coil 144 is similar to coil 44 but more compact. The coil 144 includes a combustion chamber 148 that defines an annular opening 149, or inlet, through which gas and oxygen flow into the combustion chamber 148. An outlet 250 defines an annular opening 253 through which the products of combustion discharge to the exterior of the RV. As seen in FIG. 14, the inlet opening 253 is positioned directly above the outlet opening 149 so that they face in the same direction.

The coil 144 is also a monolithic structure which is formed from a single tube. The coil 144 includes the expanded combustion chamber 148 which has a diameter 184. The coil 144 then transitions through an expansion 150 to a first straight section 152 having a diameter 186 that is smaller than diameter 184. The first straight section 152 transitions to a first bend 154 which is a standard bend where the centerline of the tube lies generally in a single plane through the bend 154. The coil 144 transitions to a second straight section 156 and then transitions to a second bend 158. From the second bend 158 the coil 144 transitions to a third straight section 160.

From the third straight section 160 the coil 144 transitions to a third bend 162 which is a compound bend. The coil 144 then transitions to a fourth straight section 164 and, in turn, transitions to a fourth bend 166, which is also a compound bend. The coil 144 then transitions through a fifth straight section 168 and a fifth bend 170. The coil 144 transitions from fifth bend 170 to a sixth straight section 172 and then to the sixth bend 174. The coil 144 transitions from the sixth bend 174 to a seventh straight section 176.

From the seventh straight section 176, the coil 144 transitions to the seventh bend 178 which is a compound bend. From the seventh bend 178, the coil 144 transitions to the eight straight section 180 and then to an eighth bend 182 which is also a compound bend, but is in a direction opposite that of the other bends 154, 158, 162, 166, 170, 174, and 178. The eighth bend 182 transitions to a ninth straight section 157 and an outlet 250.

Figure 12:
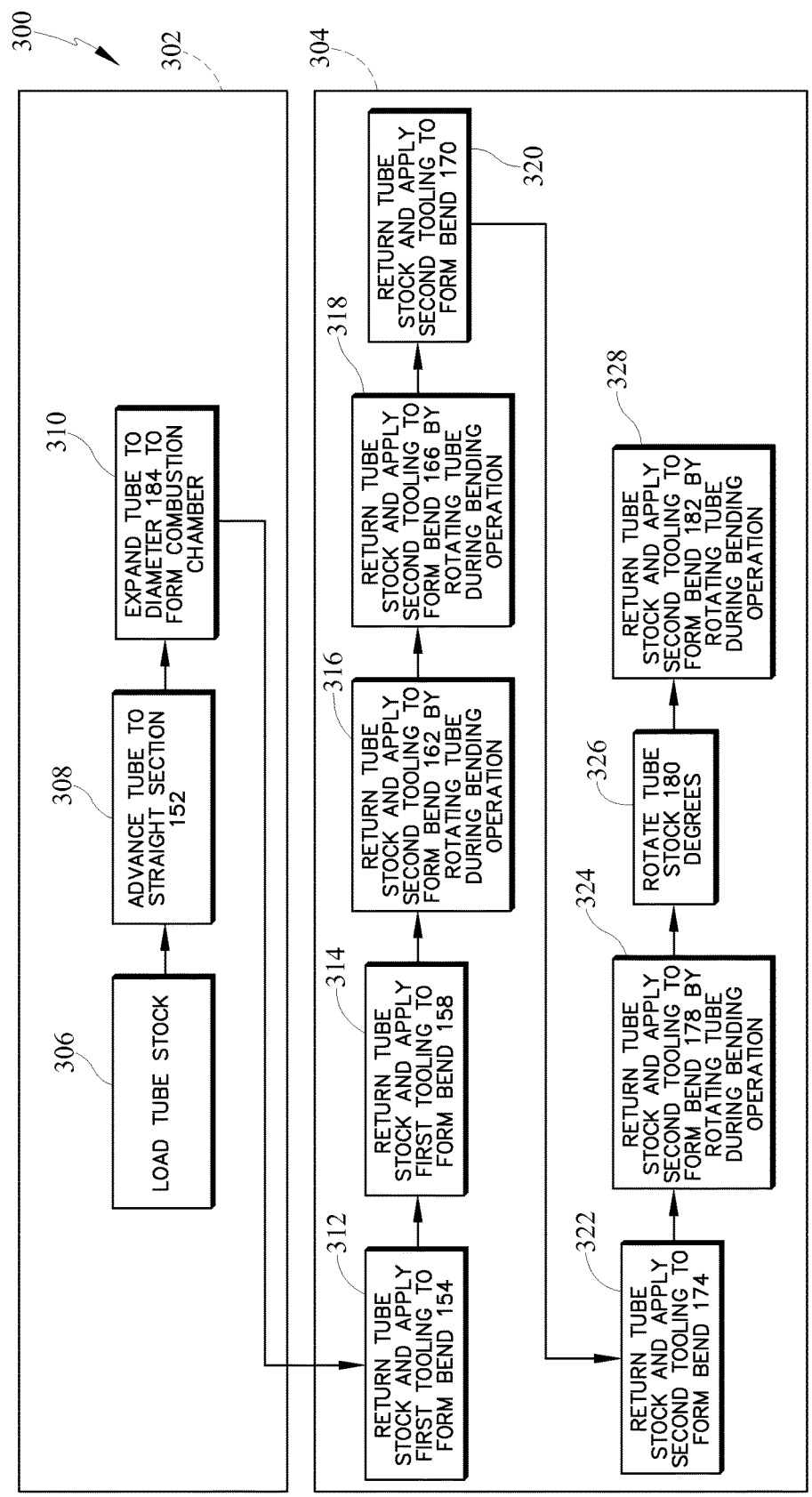
FIG. 12 is a process flow diagram outlining an embodiment of a manufacturing process that may be used to produce the second embodiment of heat exchanger coil.
Figure 13:
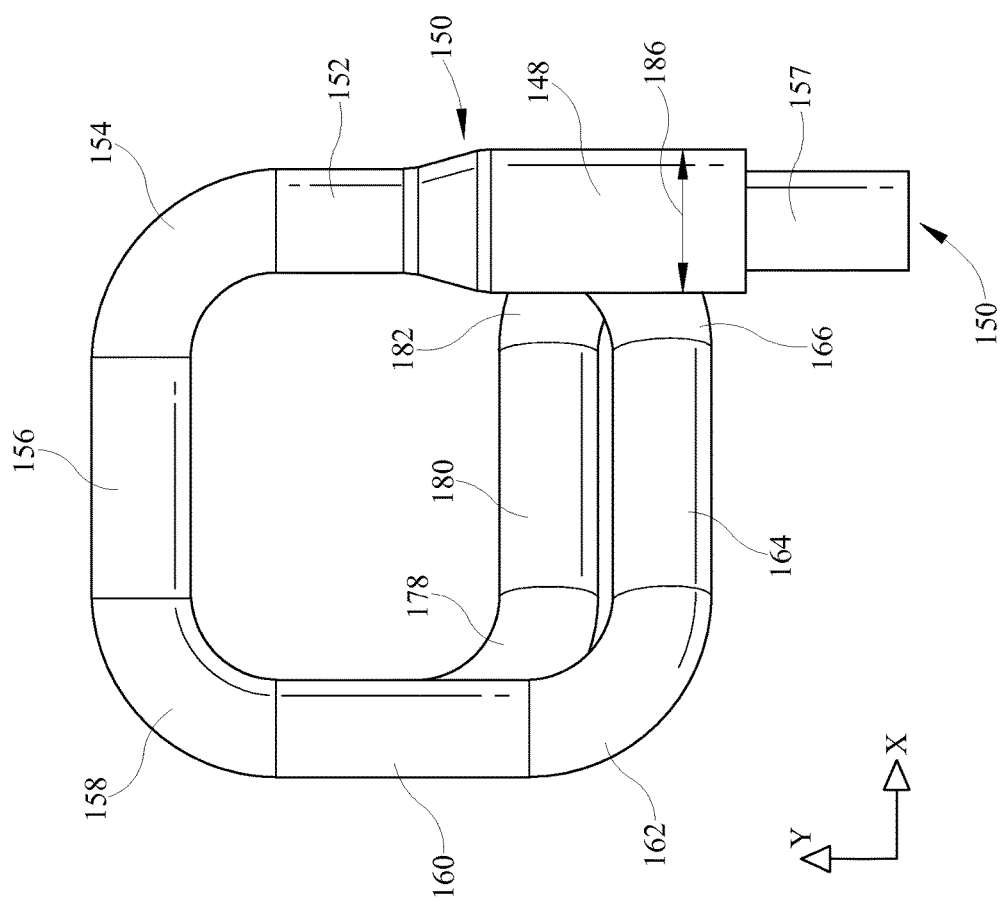
FIG. 13 is a top plan view of the second embodiment of heat exchanger coil.

An illustrative process flow for forming the coil 144 is shown FIG. 12. The coil forming process 300 can be illustrated as two separate processes: a tube sizing process 302 and a coil shaping process 304. In the tube sizing process 302, the tube stock is loaded into the forming apparatus at step 306. The tube is advanced to a predetermined location, such as the location of straight section 152 in step 308. At step 310, the tube is mechanically deformed to expand to the diameter 184 and reduce the wall thickness to form the combustion chamber 148. As discussed above, in some embodiments, this is accomplished by inserting a roller into the interior of the tube and clamping a die on the outer diameter of the tube. The roller is then expanded and rotated to work the tube material, expanding into the die. In some embodiments, the roller and die move along the length of the tube as it is expanded. Other methods of tube expansion may be implemented as well, such a hydroforming, for example.

Once the tube is expanded appropriately, the tube is positioned in a tube bending apparatus at step 312 and a first set of bend tooling which matches the outer diameter 186 is applied and the bend 154 is formed. At step 314, the tube is then further advanced and the first set of bend tooling is applied to form bend 158.

The tube is advanced to position the tube to form bend 162 at step 316. The bend 162 is formed by simultaneously bending the tube and rotating it along its longitudinal axis to form the compound bend 162. The tube is then advanced again and at step 318, the bend 166 is formed similarly to bend 162.

At step 320 the tube is advanced and the bend 170. The tube is still advanced again and at step 322 the bend 174 is formed. At step 324, the tube is advanced and the bend 178 is formed using the technique of combining the rotation of the tube about the longitudinal axis as the bend 178 is formed.

The tube is then rotated about the longitudinal axis by 180° at step 326. This allows the bend 182 to be formed at a reverse angle as compared to the bends 154, 158, 162, 166, 170, 174, and 178. After the tube is rotated at step 326 the bend 182 is formed as a compound bend as described above.

While not disclosed as part of the process described, in some embodiments, the coil 144 may be trimmed to meet dimensional requirements. Other finishing operations may be applied to de-burr the coil 144 as well.

Figure 22:
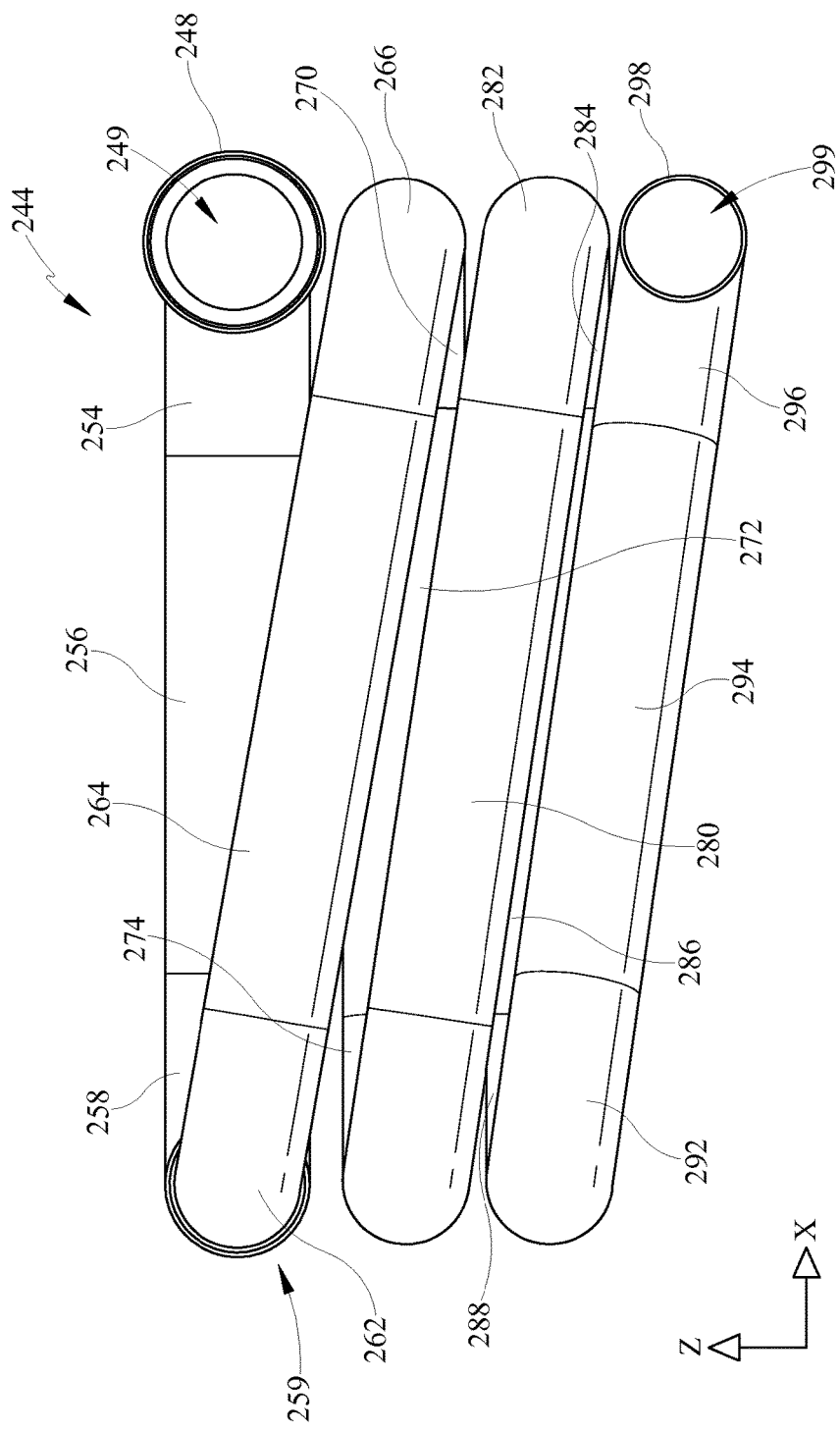
FIG. 22 is a front plan view of the third embodiment of heat exchanger coil.
Figure 23:
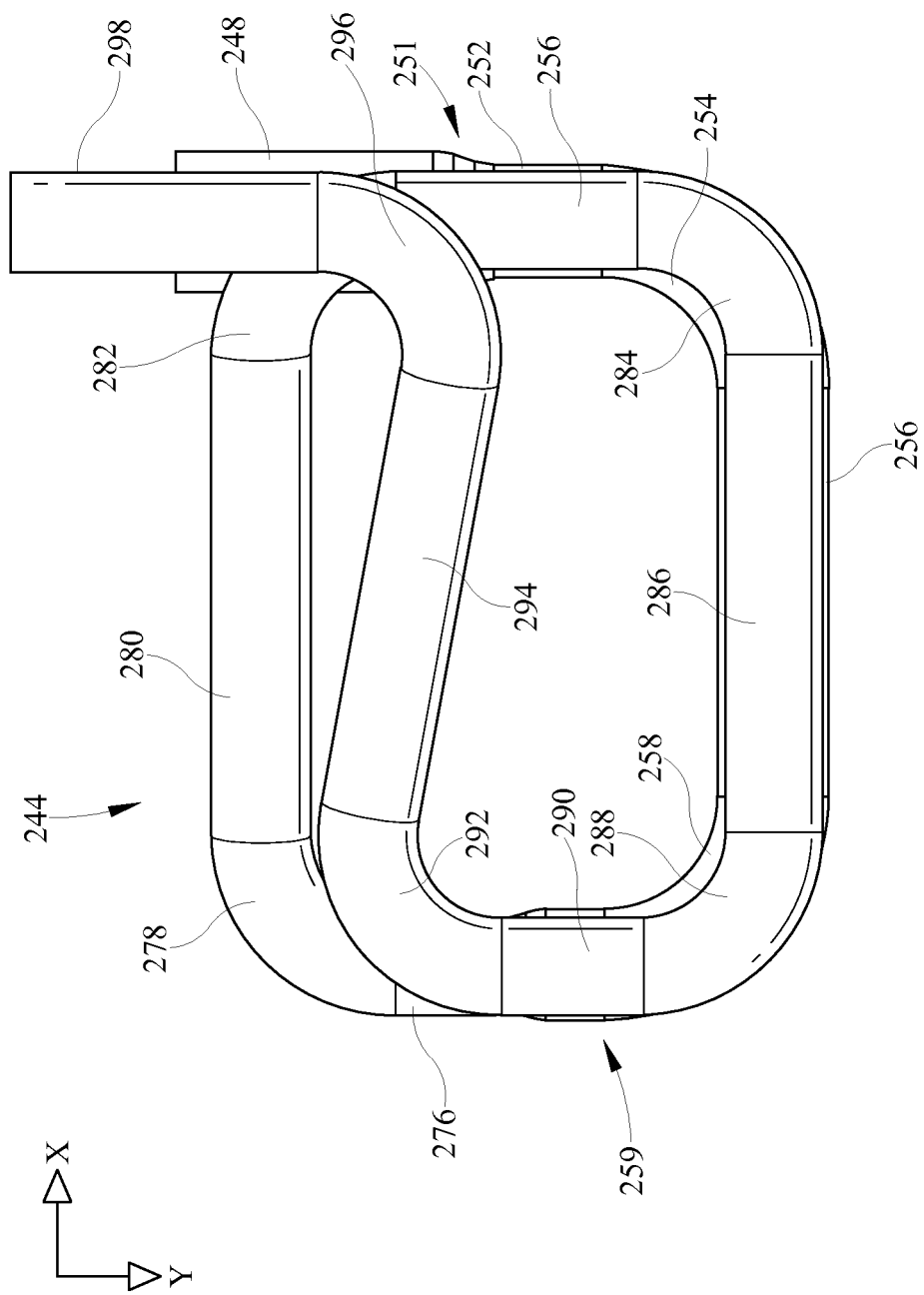
FIG. 23 is a bottom plan view of the second embodiment of heat exchanger coil.
Figure 24:
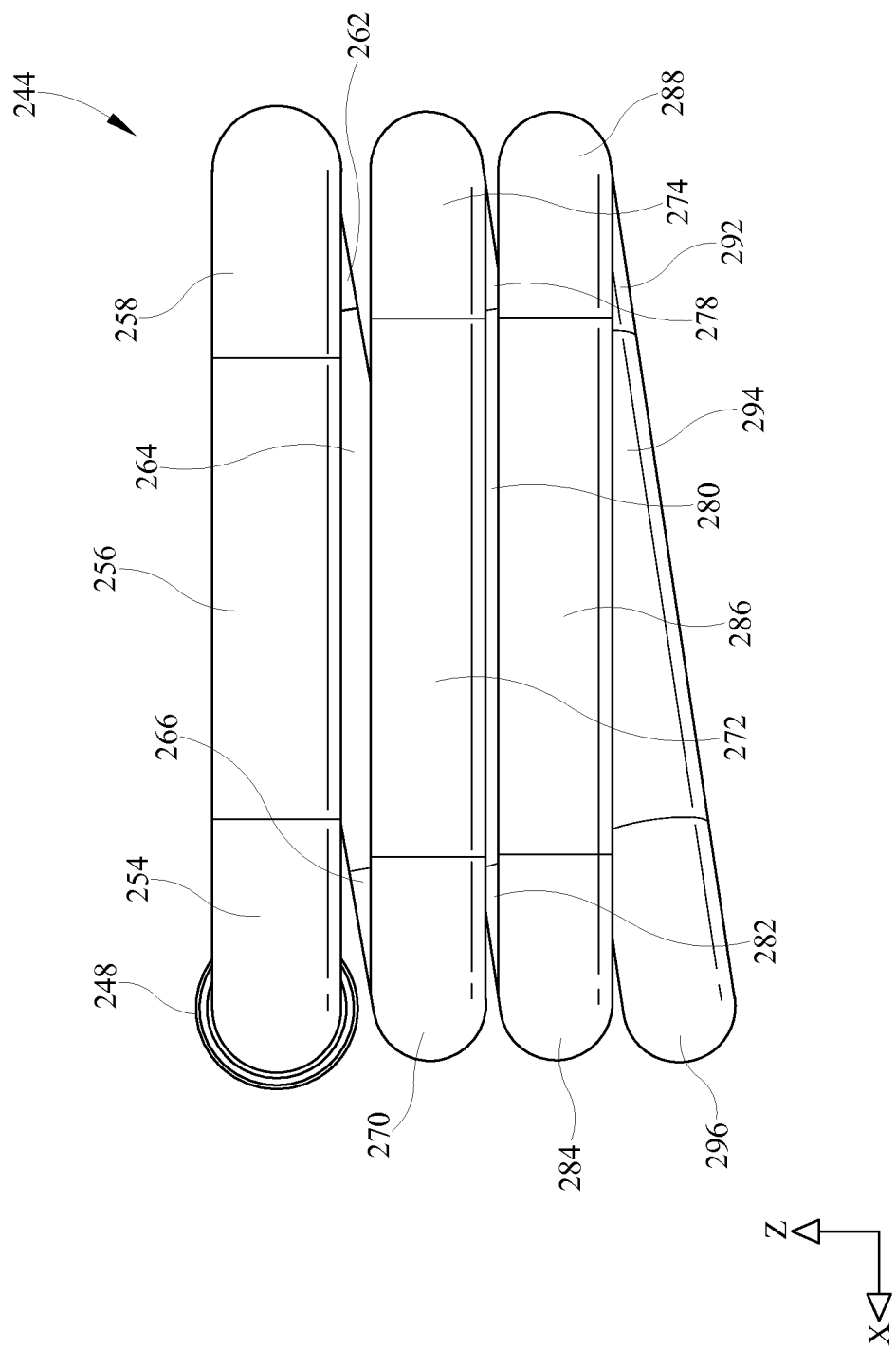
FIG. 24 is a back plan view of the second embodiment of heat exchanger coil.
Figure 25:
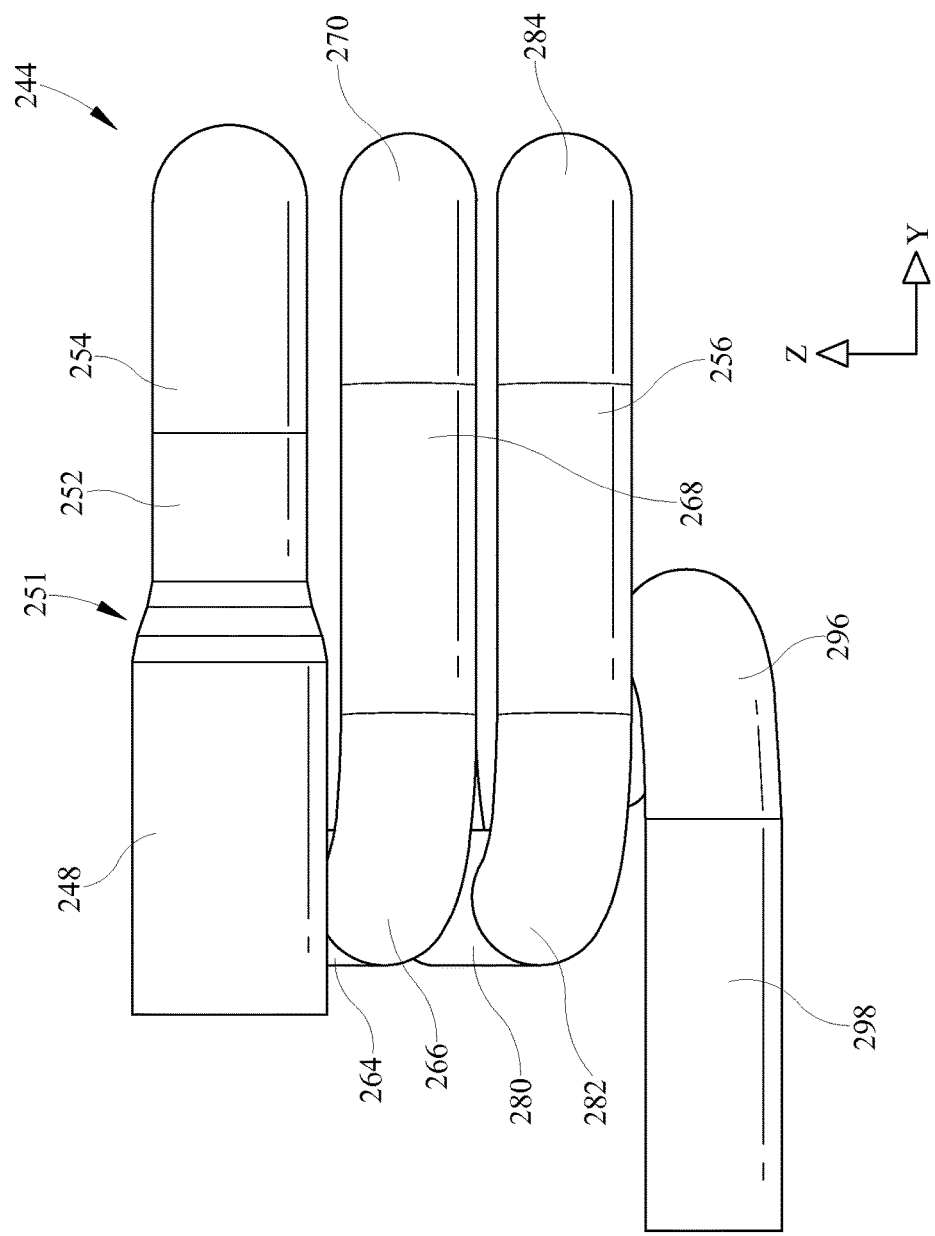
FIG. 25 is a side plan view of the second embodiment of heat exchanger coil taken from the right side as the second embodiment of heat exchanger coil is presented in FIGS. 21-23.
Figure 26:
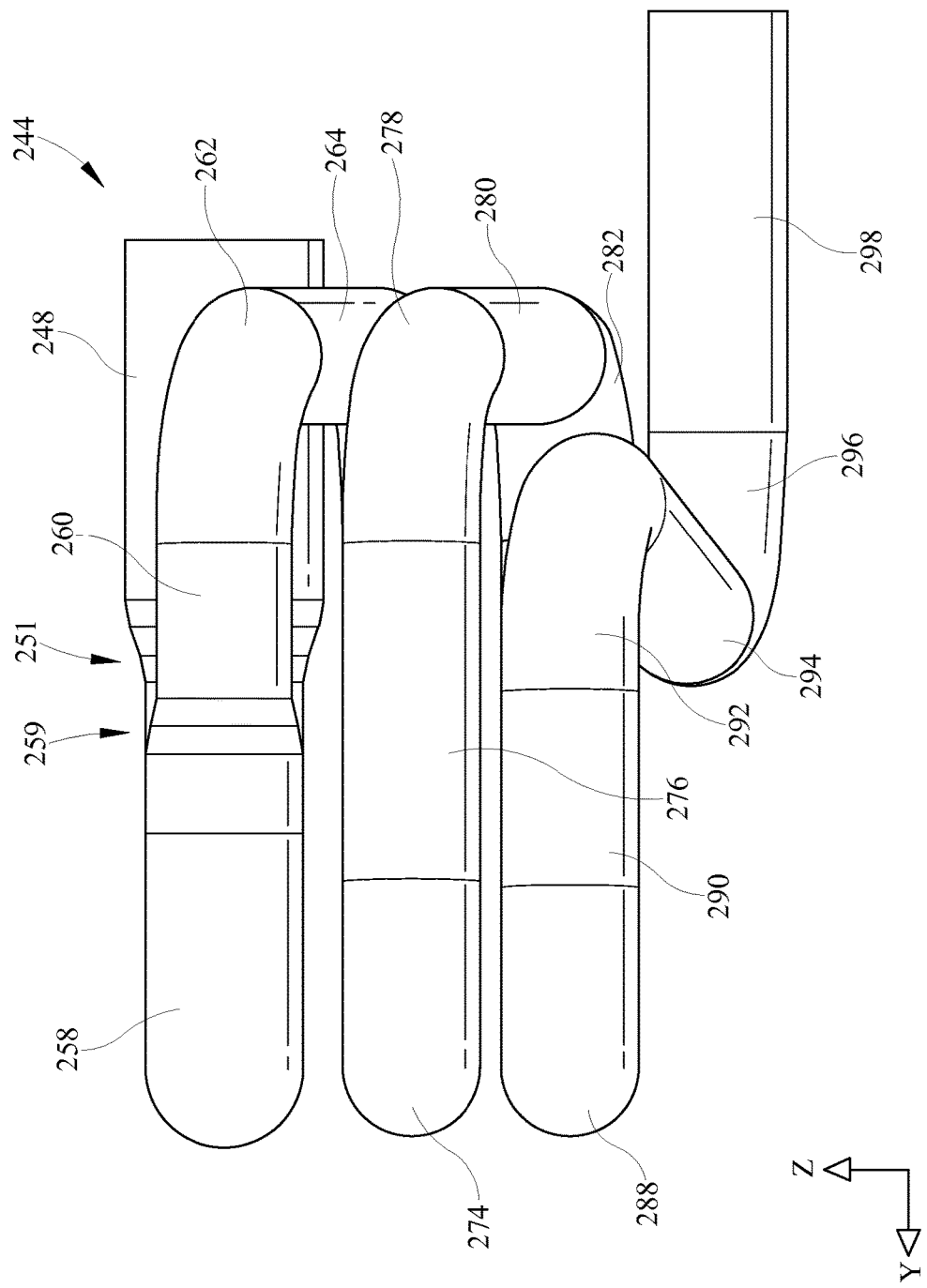
FIG. 26 is a side plan view of the second embodiment of heat exchanger coil taken from the left side as the second embodiment of heat exchanger coil is presented in FIGS. 21-23.

In another embodiment shown and described in FIGS. 19-26, another heater coil 244 is similar to coil 44 but larger. The coil 244 includes a combustion chamber 248 that defines an annular opening 249, or inlet, through which gas and oxygen flow into the combustion chamber 248. An outlet 298 defines an annular opening 299 through which the products of combustion discharge to the exterior of the RV. As seen in FIG. 22, the inlet opening 298 is positioned directly above the outlet opening 249 so that they face in the same direction.

The coil 244 is also a monolithic structure, formed from a single tube. The coil 244 includes an expanded combustion chamber 248 which has a diameter 284. The combustion chamber 248 then transitions through an expansion 251 to a first straight section 252 having a diameter 287. The first straight section 252 transitions to a first bend 254 which is a standard bend where the centerline of the tube lies generally in a single plane through the bend 254. The coil 244 transitions from the first bend 254 to a second straight section 256 and then transitions to a second bend 258. From the second bend 258 the coil 244 transitions through a second expansion 259 to a third straight section 260 which has the unexpanded tube diameter 211.

The third straight section 260 transitions to a third bend 262 which is a compound bend. The third bend 262 transitions to a fourth straight section 264 which, in turn, transitions to a fourth bend 266, which is also a compound bend. The coil 244 then transitions through a fifth straight section 268 and a fifth bend 270. The coil 244 transitions from fifth bend 270 to a sixth straight section 272 and then to the sixth bend 274. The coil 244 transitions from the sixth bend 274 to a seventh straight section 276.

From the seventh straight section 276, the coil 244 transitions to the seventh bend 278 which is a compound bend. From the seventh bend 278, the coil 244 transitions to the eight straight section 280 and then to an eighth bend 282 which is also a compound bend. The eighth bend 182 transitions to a ninth straight section 256.

From the ninth straight section 256, the coil 244 transitions to a ninth bend 284. From the ninth bend 284, the coil 244 transitions to the tenth straight section 286 and then to a tenth bend 288. The tenth bend 288 transitions to an eleventh straight section 290. The eleventh straight section 290 transitions to an eleventh bend 292, which is a compound bend, but is in a direction opposite that of the other bends 254, 258, 262, 266, 270, 274, 278, 282, 284, and 288. The coil 244 then transitions to a twelfth straight section 294 and another compound bend 296. The coil 244 then transitions to an outlet 298.

Figure 20:
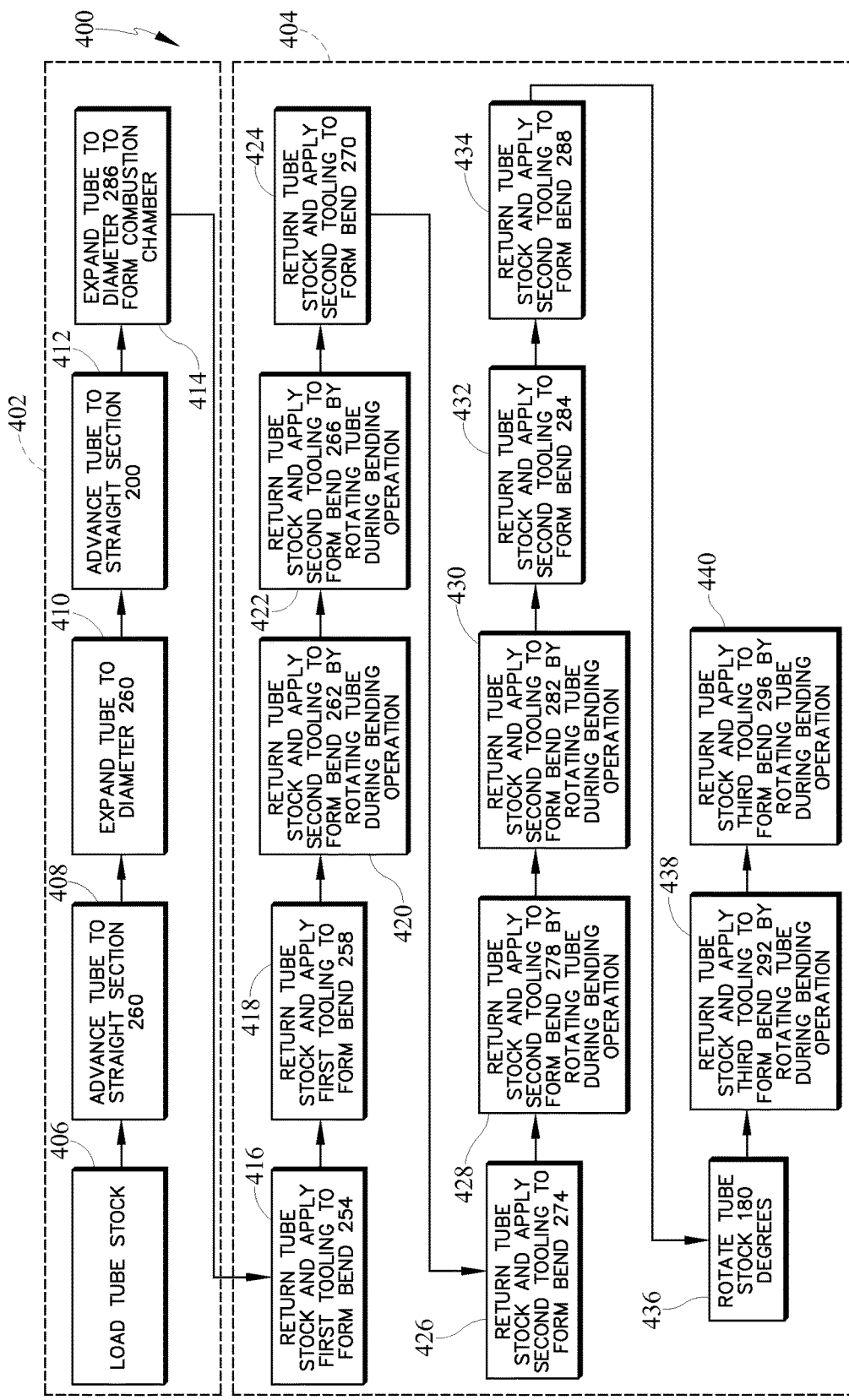
FIG. 20 is a process flow diagram outlining an embodiment of a manufacturing process that may be used to produce the third embodiment of heat exchanger coil.
Figure 21:
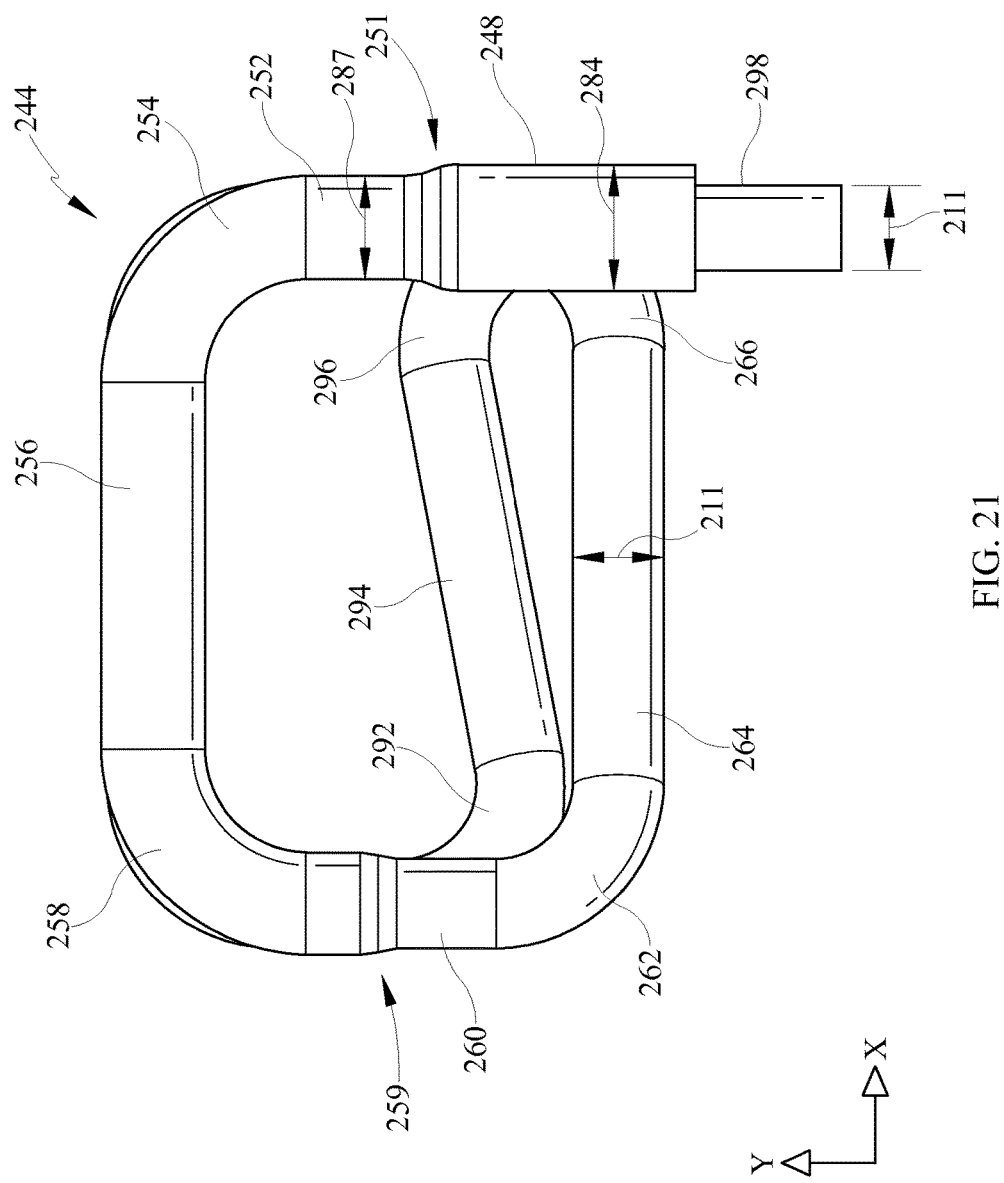
FIG. 21 is a top plan view of the third embodiment of heat exchanger coil.

An illustrative process flow for forming the coil 244 is shown FIG. 20. The coil forming process 400 can be illustrated as two separate processes: a tube sizing process 402 and a coil shaping process 404. In the tube sizing process 402, the tube stock is loaded into the forming apparatus at step 406. The tube is advanced to a predetermined location, such as the location of straight section 260 in step 408. At step 410, the tube is mechanically deformed to expand to the diameter 287 and reduce the wall thickness. The tube is then advanced to a predetermined location such as the straight section 252 at step 412. At step 414, the tube is expanded to diameter 284 and the wall thickness is reduced to form the combustion chamber 248. As discussed above, in some embodiments, this is accomplished by inserting a roller into the interior of the tube and clamping a die on the outer diameter of the tube. The roller is then expanded and rotated to work the tube material, expanding into the die. In some embodiments, the roller and die move along the length of the tube as it is expanded. Other methods of tube expansion may be implemented as well, such a hydroforming, for example.

Once the tube is expanded appropriately, the coil shaping process 404 is commenced when the tube is positioned in a tube bending apparatus at step 416 and a first set of bend tooling which matches the outer diameter 260 is applied and the bend 254 is formed. At step 418, the tube is then further advanced and the first set of bend tooling is applied to form bend 258.

The tube is advanced to position the tube to form bend 262 at step 420. At step 420 a second set of tooling that is matched to the diameter 211 of the unexpanded tube is applied. The bend 262 is formed by simultaneously bending the tube and rotating it along is longitudinal axis to form the compound bend 262. The tube is then advanced again and at step 422, the bend 266 is formed similarly to bend 262.

At step 424 the tube is advanced and the bend 270 by applying a second set of tooling. The tube is still advanced again and at step 426 the bend 274 is formed. At step 428, the tube is advanced and the bend 278 is formed using the technique of combining the rotation of the tube about the longitudinal axis as the bend 278 is formed. At step 430, the tube is again advanced and the compound bend 282 is formed by rotating the tube about the longitudinal axis of the tube as the tube is bent.

At step 432 the tube is advanced and the bend 284 is formed. The tube is still advanced again and at step 434 the bend 288 is formed. The tube is then rotated about the longitudinal axis by 180° at step 436. A third set of tooling is applied at step 438 to provide a different bend radius from the bend radius of bends 254, 258, 262, 266, 270, 274, 278, 282, 284, and 288. Because the tube is rotated 180° at step 436, the bend 292 is formed at a reverse angle as compared to the bends 254, 258, 262, 266, 270, 274, 278, 282, 284, and 288. After the tube is rotated at step 436, the process advances to step 438 and the bend 292 is formed as a compound bend as described above. At step 440, the tube is advanced and the compound bend 266 is also formed. It should be noted that bend 266 is also at a reverse angle as compared to bends 254, 258, 262, 266, 270, 274, 278, 282, 284, and 288.

While not disclosed as part of the process described, in some embodiments, the coil 144 may be trimmed to meet dimensional requirements. Other finishing operations may be applied to de-burr the coil 144 as well.

Although the invention has been described with reference to the preferred embodiments, variations and modifications exist within the scope and spirit of the invention as described and defined in the following claims.

The invention claimed is:

1. A heat exchanger comprising
a continuous multi-turn coil formed of a single piece of tube stock having a plurality of bends and defining an inlet at an end of a first straight section and an outlet at an end of a second straight section, said coil having at least two revolutions between said inlet and said outlet and through multiple parallel planes, each revolution of the coil including a plurality of generally linear portions, each generally linear portion interposed between two bends, said coil further comprising a plurality of transitions of varying diameter and wall thickness formed of said single piece of tube stock and wherein said first and second straight sections are parallel and vertically aligned;
wherein the inlet defines a first opening and the outlet defines a second opening, the inlet and outlet facing the same direction; and
wherein the first straight section is collinear with at least one of the plurality of transitions and is configured to surround a burner.

2. The heat exchanger of claim 1, wherein the coil has at least one section that has a cross-sectional tube diameter that is different from the cross-sectional tube diameter in another section of the coil.

3. The heat exchanger of claim 1, wherein at least one of the bends is in a direction that is opposite of the other of the bends.

4. The heat exchanger of claim 3, wherein at least one bend is defined by a tube segment wherein the centerline defined by the cross-sectional diameter of the tube segment does not generally lie in a single plane.

5. The heat exchanger of claim 1, wherein the cross-sectional diameter of a first tube segment is different from the cross-sectional diameter of a second tube segment.

6. The heat exchanger of claim 1, wherein the inlet defines an opening and the outlet defines an opening, the inlet and the outlet facing the same direction.

7. A heat exchanger comprising
a continuous coil formed of a single piece of tube stock having a plurality of bends and defining an inlet at an end of a first straight section and an outlet at an end of a second straight section, said coil having at least one revolution between an inlet and an outlet, the coil including a plurality of generally linear portions, each generally linear portion interposed between two bends, the inlet of the coil having a first cross-sectional diameter, the outlet of the coil having second cross-sectional diameter that is smaller than the first cross-sectional diameter wherein a transition defined by said single piece of tube stock and located between said first and second diameters of said single piece of tube stock, a plurality of transitions of varying diameter and wall thickness disposed between said inlet and said outlet.

8. The heat exchanger of claim 7, wherein the coil has at least one section that has a cross-sectional tube diameter that is different from the cross-sectional tube diameter of both the inlet and the outlet.

9. The heat exchanger of claim 7, wherein at least one of the bends is in a direction that is opposite of the other of the two bends.

10. The heat exchanger of claim 9, wherein at least one bend is defined by a tube segment wherein the centerline defined by the cross-sectional diameter of the tube segment does not generally lie in a single plane.

11. The heat exchanger of claim 7, wherein at least two of the bends of the coil are each defined by a tube segment wherein the centerline defined by the cross-sectional diameter of the first tube segment lies in a first generally common plane and the centerline defined by the cross-sectional diameter of the second tube segment lies in a second generally common plane, the first plane generally parallel and spaced apart from the second plane.

12. The heat exchanger of claim 11, wherein the cross-sectional diameter of the first tube segment is different from the cross-sectional diameter of the second tube segment.

13. The heat exchanger of claim 7, wherein the coil includes at least two bends separated by a single linear segment, each of the two bends is defined by a respective tube segment wherein the centerline defined by the cross-sectional diameter of the respective tube segment does not generally lie in a single plane.

* * * * *